(12) United States Patent
Pavol

(10) Patent No.: US 9,918,070 B2
(45) Date of Patent: Mar. 13, 2018

(54) METHOD FOR DESCRIPTION OF OBJECT POINTS OF THE OBJECT SPACE AND CONNECTION FOR ITS IMPLEMENTATION

(71) Applicant: Beistar3D Limited, Tsim Sha Tsui Hong Kong (CN)

(72) Inventor: Janík Pavol, Zilina (SK)

(73) Assignee: Beistar3D Limited, Hong Kong (HK)

( * ) Notice: Subject to any disclaimer, the term of this patent is extended or adjusted under 35 U.S.C. 154(b) by 229 days.

(21) Appl. No.: 14/421,895

(22) PCT Filed: May 13, 2013

(86) PCT No.: PCT/IB2013/000913
§ 371 (c)(1),
(2) Date: Feb. 16, 2015

(87) PCT Pub. No.: WO2014/033511
PCT Pub. Date: Mar. 6, 2014

(65) Prior Publication Data
US 2015/0195508 A1    Jul. 9, 2015

(30) Foreign Application Priority Data

Aug. 29, 2012 (CZ) .................................. 2012-586

(51) Int. Cl.
*G06T 15/00* (2011.01)
*G06T 15/04* (2011.01)
(Continued)

(52) U.S. Cl.
CPC ......... *H04N 13/0203* (2013.01); *G06T 7/593* (2017.01); *H04N 13/0239* (2013.01);
(Continued)

(58) Field of Classification Search
CPC ............ G06T 11/203; G08B 13/19691; H04N 13/0018; H04N 5/225; G01B 11/00
See application file for complete search history.

(56) References Cited

U.S. PATENT DOCUMENTS

| 2002/0122045 A1* | 9/2002 | Woodson | G06T 11/203 345/611 |
| 2003/0071194 A1* | 4/2003 | Mueller | G01B 11/00 250/208.1 |

(Continued)

*Primary Examiner* — Sath V Perungavoor
*Assistant Examiner* — Patricia I Young
(74) *Attorney, Agent, or Firm* — Oppedahl Patent Law Firm LLC

(57) ABSTRACT

A method of description of points of an object from object space is disclosed, wherein for each point of the object of object space displayed on a graticule of a scanning device, information about point distance from the scanning device is registered and then stored to each point of the graticule of image as additional data. Furthermore, connection for implementation of said method covering a scanning device is disclosed, wherein a scanning system consists of at least two scanning devices connected to inputs of CPU central control unit, which includes a block of software applications and a block of computing module with evaluation software, whereas communication of the block of software applications and the block of calculation module with the evaluation software with CPU occurs via data buses, whereas CPU outputs are connected both on a block of internal memory and/or removable memory and a block of online outputs.

7 Claims, 23 Drawing Sheets

Figure 1:
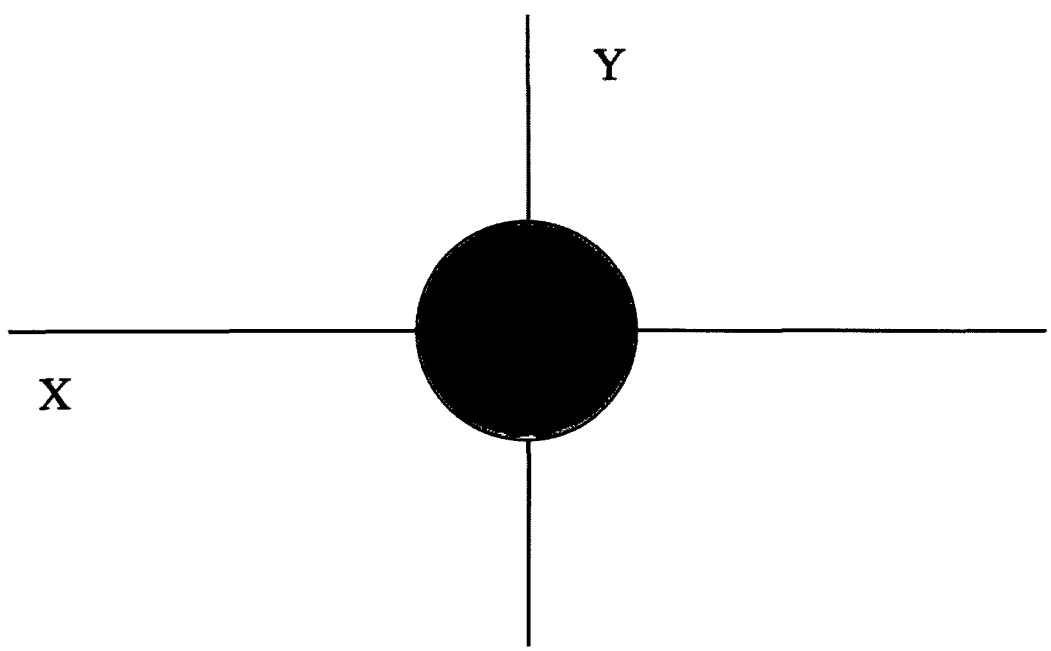

(51) Int. Cl.
*G06T 7/00* (2017.01)
*G06T 17/00* (2006.01)
*H04N 5/232* (2006.01)
*H04N 13/02* (2006.01)
*G06K 9/00* (2006.01)
*G06T 7/593* (2017.01)

(52) U.S. Cl.
CPC ............... *H04N 13/0271* (2013.01); *G06T 2207/10012* (2013.01); *G06T 2207/10024* (2013.01)

(56) References Cited

U.S. PATENT DOCUMENTS

| | | | |
|---|---|---|---|
| 2010/0002070 A1* | 1/2010 | Ahiska | G08B 13/19691 348/36 |
| 2011/0225523 A1* | 9/2011 | Newton | H04N 13/0018 715/762 |
| 2013/0169820 A1* | 7/2013 | Stewart | H04N 5/225 348/169 |

* cited by examiner

METHOD FOR DESCRIPTION OF OBJECT POINTS OF THE OBJECT SPACE AND CONNECTION FOR ITS IMPLEMENTATION

FIELD OF THE INVENTION

The invention relates to the method for description of object points of the object space and registration of image information and connection for its implementation.

BACKGROUND OF THE INVENTION

People use eyes for viewing of surrounding world and the human beings are able thanks to eyes to navigate within space based on information about scene depth. Dimensional (stereometric) perception of a static image, which is produced in human brain when viewing two planar displaced images of the same scene, was already described in 1830s by Sir Charles Wheatstone. We are not able to clearly distinguish depth information when viewing two-dimensional image. In the case of vision with one eye, one is able to perceive depth on the basis of monocular phenomena only. Two eyes are required to view three-dimensional (stereoscopic) images. Binocular vision is perceiving of scenes or images with both eyes. Resulting images are reflected on retina and brain reconstructs the same to perception of dimensional appearance. Stereoscopy is a branch involved in displaying of dimensional images or frames whereas two frames created for left and right eye are called a stereo pair. Stereoscopic video frequency is viewing of a sequence of consecutive frames. Recently, stereoscopy has been widely applied in different scientific branches, in the field of entertainment industry or elsewhere. It is known that visualization technologies have been long used for three-dimensional (stereoscopic) imaging. These systems do not project just one image for both eyes but try to project one of a pair of separated views for each eye. Stereoscopic imaging of two images displayed next to each other is known. Historically, it is the oldest method used still today. Using stereo-viewers (so-called stereoscopes), two static images captured by cameras horizontally shifted by eye span (about 7 cm) and placed next to each other are viewed with glasses. Similarly to audio technology, this distance is usually called as stereo basis. Special cameras with two lenses were and are produced for these purposes. Thanks to digital imaging, the required shifted images can be created using special software applications from a digital image. Glasses allow either direct (where right eye views right component image and left eye views left component image) or cross viewing of the shifted images (where right eye views left component image and left eye views right component image). Experiments showed that the "crossed" viewing is what allows expansion of the field of vision and improvement of stereoscopic effect depth. Glasses with special prismatic optics have been developed for this imaging. In this case, the component images are crossed as well. The principle works also for movable images and therefore, it is theoretically applicable for television, however, special horizontal scanning is required. The advantages of these systems include sufficient brightness of resulting image because the contributions of brightness of the component images are fully added. The component images are often picture slides. Another of these 3D imaging principles is stereoscopic imaging of superposition of two shifted images (Anaglyph system). The viewed image consists of superposition of two component images (so-called anaglyph) concurrently taken by two cameras that are again horizontally shifted by distance of eyes and therefore, project a scene under different angles. In cinematography or project television screen, the component images are projected on canvas via colour filters (cyan and red). A viewer watches the screen with glasses with corresponding colour glasses. This colour filtration makes sure that each eye perceives just a component image and the brain produces spatial perception. This method of separation may in case of colour images distort colour perception of resulting virtual image. Many versions of this system have been gradually developed. One of them is for example Color Code 3D system where different colour combination is used (yellow-dark blue in filters of projectors and amber-dark blue in filters of glasses). Anachrome Method should be mentioned as well with substantially narrower stereo basis aiming at possibility to view anaglyph even without glasses—without dimensional perception, of course. A disadvantage of this method is—except for necessity of using special glasses—small permissible deviation from viewer's position from the image axis at which the spatial perception (stereoscopic effect) shows. Today, in the era of digital photograph, there are many software applications to produce anaglyph from a standard 2D digital image. Another method for viewing is 3D glasses fitted with variously polarized filters (with orthogonal or circular polarization). Also in this case, the resulting image consists of concurrent superposition of two component images taken by shifted cameras. The superposition is created on the projection screen by projection from two projectors fitted with polarization filters with different orientations or polarization directions. Viewer watches the screen with glasses with corresponding polarization filters of different polarization for each eye. Advantage of this somewhat more expensive method is reduced colour distortion of the colour perception. However, the projection screen is very expensive (specially treated silver canvas) because it may not change to polarization of incident and reflected light flux (depolarization).

Fundamental disadvantage of the solutions described above is the problem of time discontinuity of signals received by brain from eyes. The reason for this time discontinuity is the fact that signals going through left and right eye reach the brain vision centre with a time shift. This results in brain instability due to unnatural receipt of image signal. The vision centre must process the discontinued signal and the centre is not made for it. The consequences of this processing of received information may include epileptic fits or headaches. An alternative is successive stereoscopic imaging of the component images with eclipsing (Eclipse Method). The component images taken by shifted cameras are displayed on a display or projected to a projection screen successively. Their sequence may be equal to e.g. a period of half-frames. To reduce distortion in case of sequences of images of quick content change, the alternating period can be reduced—e.g. using 100 Hz exposition. Luminophores of the display (particularly green) or the projection screen used must not show long afterglow for the same reason. Also special glasses are required in this case. Apertures of left and right eye are successively eclipsed and opened in a synchronized way with alternating of the component images. The required synchronizing signal is usually emitted in the IR radiation band and this may practically restrict the viewing space and number of viewers. Technical applicability can be provided e.g. by LCD SH Shutter Glasses). For this version, the viewing angle is wider. For the last described method, signal is emitted concurrently from the first and second projector and the only difference between the signals is that one image has blue component blocked and the other has red component blocked. Because human eye is the most sensitive to green colour (up to 70% of image information consists of green colour), brain gets confused and human perceives the image as stereo image albeit slightly shifted in colour tones. Of course, this presents a different perception load but the problems described above (headache and epileptic fits) are mitigated. The last of the described methods could be implemented in passive asynchronous form where viewer's glasses function control is not required. In this case, the component images are projected in a time sequence by two projectors equipped with polarization filters with different polarization directions. The viewers use the glasses with corresponding polarization filters of different polarization for each eye similarly to the method described earlier. Disadvantage common for all 3D systems described in this section is the necessary use of special glasses. In addition, bibliography describes "Mesh-Based Depth Coding For 3d Video Using Hierarchical Decomposition Of Depth Maps", Sung-Yeol Kim and Yo-Sung Ho, Gwangju Institute of Science and Technology (GIST) 1 Oryong-dong Buk-gu, 500-712, Gwangju, Korea). This article describes the process for 3D imaging based on a structure of triangle fields connected into the structure of a planar grid. The system is based on taking with right and left camera. Then, the photos taken from left and right camera superpose and where the image areas can be mutually defined and calculated, a triangle of single colour is defined with at least several points in each direction. Considering the side shift of right and left image it could be calculated which of the triangles would be higher and lower. The triangles being virtual and placed in a virtual centre produce a compact area that breaks depending on the space squeezing system. In this way, partial image plasticity could therefore be created. Whereas this triangle grid may behave, for example as metal sheet surface in a press mould, certain image profiling could be achieved, however, it is in no way possible to achieve neither high image depth dynamics as required for real imaging nor precise point structure. The problem is that surface is calculated by the areas of triangles and their squeezing up or down produces the illusion of space. However, this is still the compact grid with differently deformed triangle fields being unable to produce visual image fidelity. This system can work only as a demonstration of possibilities of the triangle fields when profiling of 2D image. However, it is important that when viewing the deformed 2D space, human beings cannot see a 3D image but partially profiled imprint of image surface only, created by colour areas and therefore without possibility of any definition of image details. No image definition in full depth dynamics occurs here but only a few per-cents when compared to real three-dimensional perception. In addition, the profiled image is created by triangle fields as non-existing central image with triangle structure of squeezed colour areas. This is a demonstration of possibilities of using the technology that is commonly only used in computer games. However, this technology is built for creation of virtual reality. Based on this procedure and calculation of the triangle grid it is almost impossible to get 3-D imagining being able to convince a human eye that it watches a real image.

SUMMARY OF THE INVENTION

The aim of the invention is designing of a new way for description of points from the object space that would allow working in 3D without necessity of using of additional optoelectronic or other aids.

The disadvantages mentioned above are removed and the aim is achieved by the method of description of the object point from the object space, substance of which is that information about distance from scanning device is recorded for each subject point of the subject space displayed on the graticule of a scanning device and information created in this way is saved to each image graticule point as additional data.

It is favourable for perfect description of the object points in the object space when distance information "I" is recorded using at least two scanning devices arranged at a certain distance from each other.

Furthermore, it is favourable when distance information "I" from the graticule point in "z" axis direction from the object point of the object space to the image graticule point is registered for each object point.

It is favourable for exact description of the objects in the object space containing the eclipsing points of different translucence level when information about their distances "I" from scanning devices is recorded for the object points of the object space containing the eclipsing points of different translucence level, whereas brightness and colour information of the eclipsing points is recorded at the same time in conjunction with the translucence level of said layer point and information generated in this way is stored to the image graticule point.

Depth information about other distances of these points from the scanning device is assigned for an image displaying several superposed areas of the layer points of different translucence level and different depth information and at the same time, brightness and colour information of the image points in conjunction with the point translucence level in the layer is recorded and information produced in this way is stored to each image as additional data.

The grounds of the invention is that the following information is added to each image information coded by any known codec:
  information about distance of each frame or image point (pixel) from the object space from the scanning device (depth imprint) either individually or in groups.
  information about the eclipsing points hidden in the image point axis behind the depth imprint points of different translucence level and different "I" distance, e.g. a scene behind imperfectly translucent glass, fog etc.
  information about the eclipsing points behind the edges of opaque points because there may be the eclipsing points of internal brightness and colour information and internal "I" distance from the scanning device behind each opaque point.

The advantages of this solution are 100% backward compatibility with existing systems of coding and image data transfer. The method of registration according to this invention allows current professional technology to work, among others, with this data as with 2D image, to edit and cut in 2D with subsequent conversion into real 3D image using information from additional data created based on our design. Combination of necessary data is not problem both with respect to adequate codecs, which store colour components of each image point directly, including broadcasting standards, and current compressed broadcasting standards that use disproportional division of brightness and colour component, so-called chroma sampling (from the most common variant 4:2:2 through all other variants and combinations, including non-standard ones such as 3:1:1 HDCAM)

Current recording of the chroma subsampling:
4:4:4 4: point position on axis X and axis Y 4: point colour information
4: point brightness information
4. point brightness information for brightness levelling across the image
4:4:4 4: point position on axis X and axis Y
4: point colour information
4: point brightness information
4:2:2 4: point position on axis X and axis Y
2: point colour information
2: point brightness information
4:2:0 4: point position on axis X and axis Y
2: point colour information
0: point brightness information
4:1:1 4: point position on axis X and axis Y
1: point colour information
1: point brightness information Based on information about depth imprint according to this invention, the record would be as follows:
4:4:4:4+depth information
4:4:4+depth information
4:2:2+depth information
4:2:0+depth information
4:1:1+depth information
4:4:4:4+depth information+4:4+depth information
4:4:4+depth information+4:4+depth information
4:2:2+depth information+2:2+depth information
4:2:0+depth information+2:0+depth information
4:4:4:4+depth information+4:4+depth information+4:4+depth information
4:4:4+depth information+4:4+depth information+4:4+depth information
4:2:2+depth information+2:2+depth information+2:2+depth information
4:2:0+depth information+2:0+depth information+2:0+depth information It is advantageous that 3D image format compiled in this way would mainly be the output of different devices from professional camcorders up to basic mobile phones, computers and tablets for consumer market.

Then, identical format may be used as input for further processing in special cut applications for video processing or corresponding graphical software for working with still images; at the same time, it would be output format as well.

Equally, the 3D image format would be used as input format for 3D imaging devices or units adapted for this purpose.

Finally, it is suitable also for storing and archiving of image data because it allows fully-fledged recording of three-dimensional scene from which simplified forms can be effectively produced, if needed (e.g. 2×2D format image for current "three-dimensional" projecting systems or imaging devices for stereograms or 2D format image for common imaging units or printing). The 3D format image according to this method is effective with respect to data flow (and therefore capacity of archiving device needed), generally thanks to saving of necessary overlaps only.

The advantage of the method according to this invention is that distance would be always assigned exactly (i.e. depth information) from the scanning device for each point of the object space. Should it be necessary to describe the object point on a place where chrominance information has saturation level under 100% (translucence is the matter) or a point not visible from the position of the scanning device, the description will consist of another "l" distance as well as brightness and chrominance information.

To precisely describe the object points of the object space, connection for implementation of the method according to previous method claims is used, which covers the scanning device substance of which is that the scanning system consists of at least two scanning devices connected to the inputs of CPU central control unit, which includes a block of software applications and a block of computing module with evaluation software, whereas communication of the block of software applications and the block of calculation module with the evaluation software with CPU occurs via data buses, whereas the CPU outputs are connected both on the block of internal memory and/or removable memory and the block of online outputs.

It is favourable for ensuring of the depth information of the object points of the object space and their assignment to the graticule points of the primary scanning device if the scanning device consists of the primary scanning device and at least one secondary scanning device.

It is favourable for description of the objects in the object space if the secondary scanning device consists of a radiation (distance) detector and a radiation emitter.

It is favourable for description of shape as well as colour of the objects in the object space if the primary scanning device or the secondary scanning device consists of a camcorder.

It is favourable when the radiation (distance) detector consists of a CCD or CMOS sensor fitted with optics and the radiation emitter consists of a laser.

It is favourable for description of the object points in the object space, either being colour- or shape-related from multiple view points up to 360° if at least three scanning systems are used, being arranged around the object (the object space) at a certain distance.

The connections designed in this way would allow correct definition and assignment of depth information data and create depth information of the object space. The scanning systems included in these connections allow to get and assign the depth information in a multiple of ways for each point of the object space, thus to create full depth information for each 2D image.

LIST OF DRAWINGS IN THE FIGURES

Figure 2:
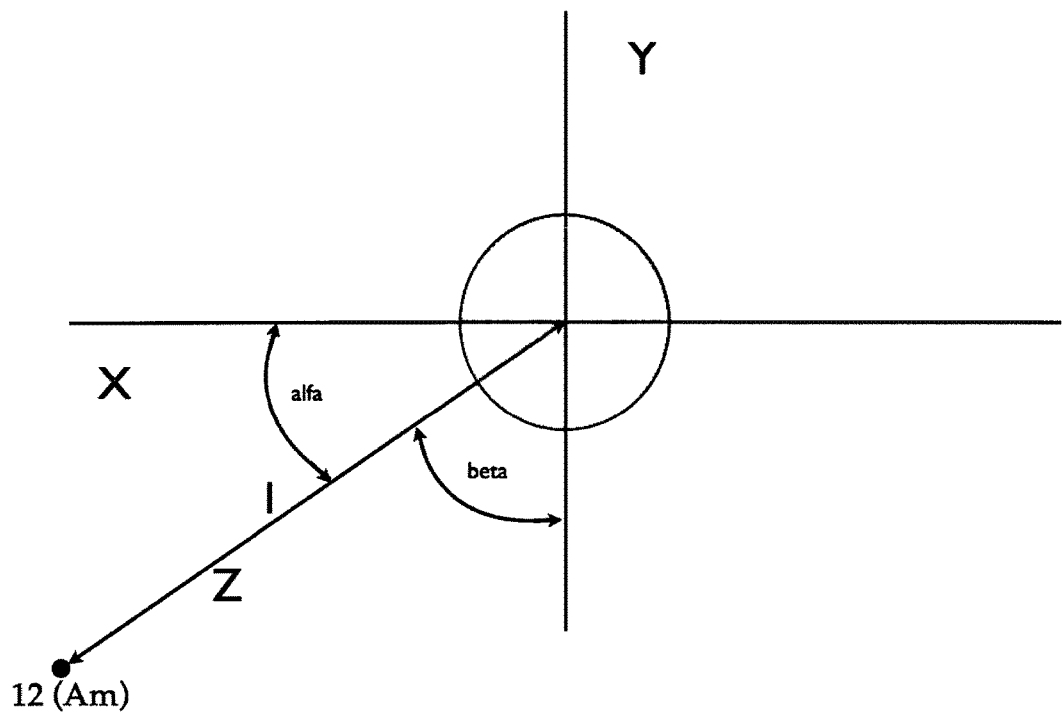
Figure 3:
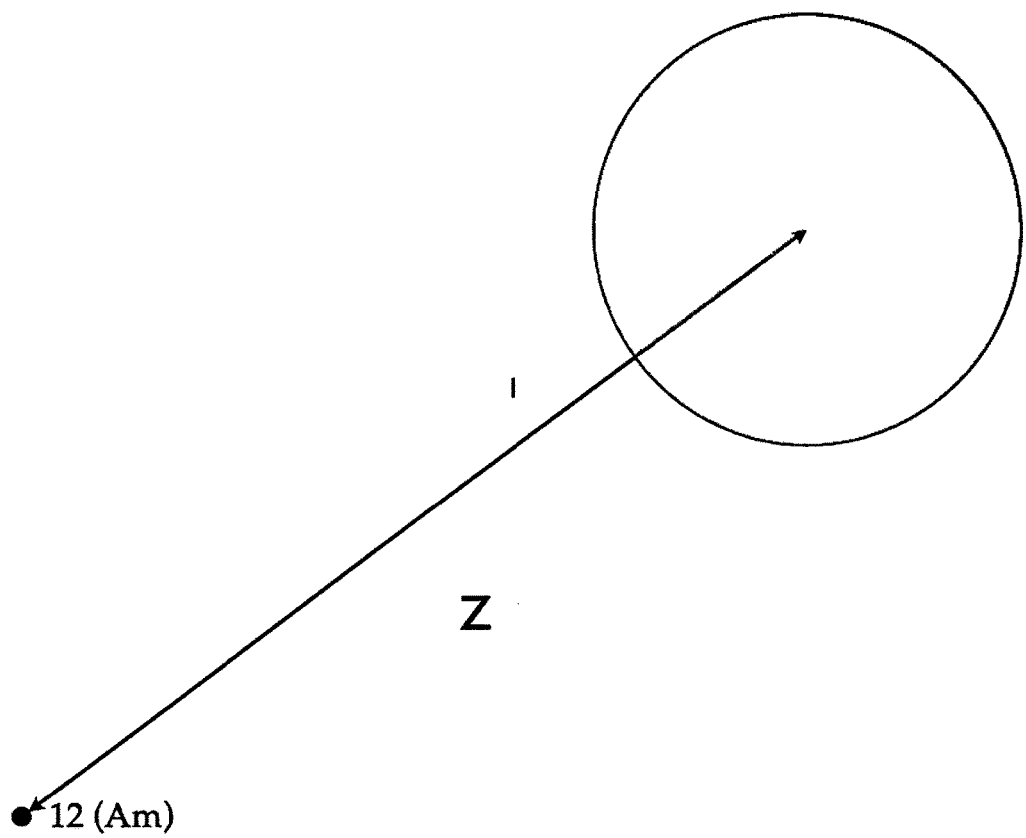
Figure 4:
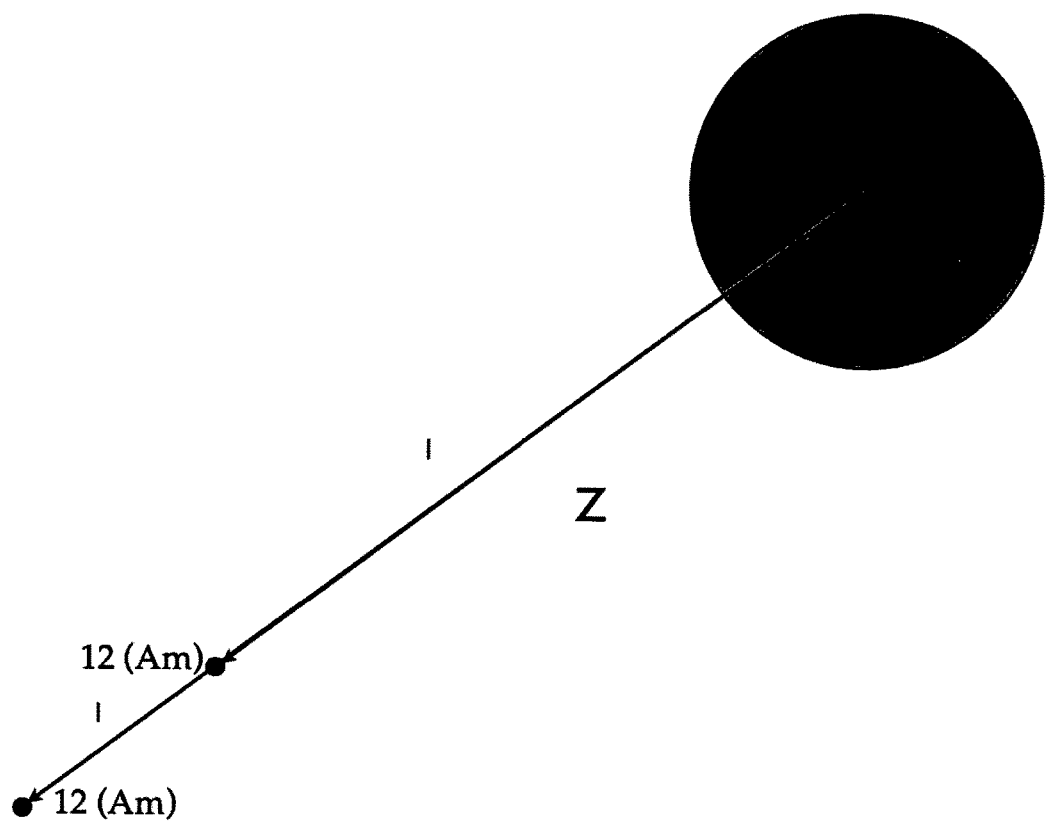
Figure 5:
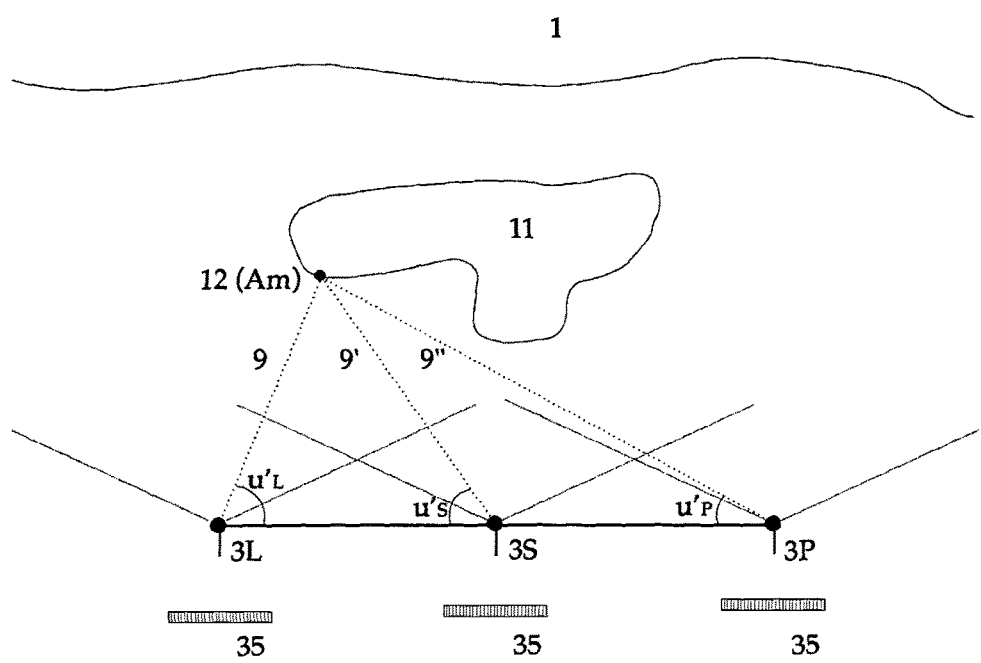
Figure 6:
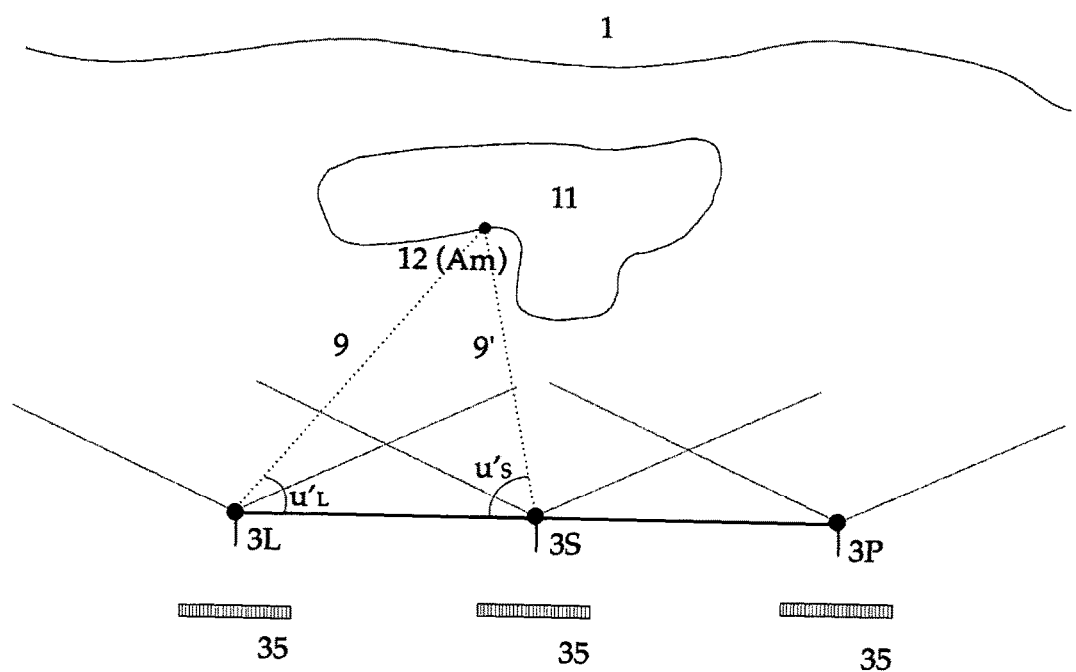
Figure 7:
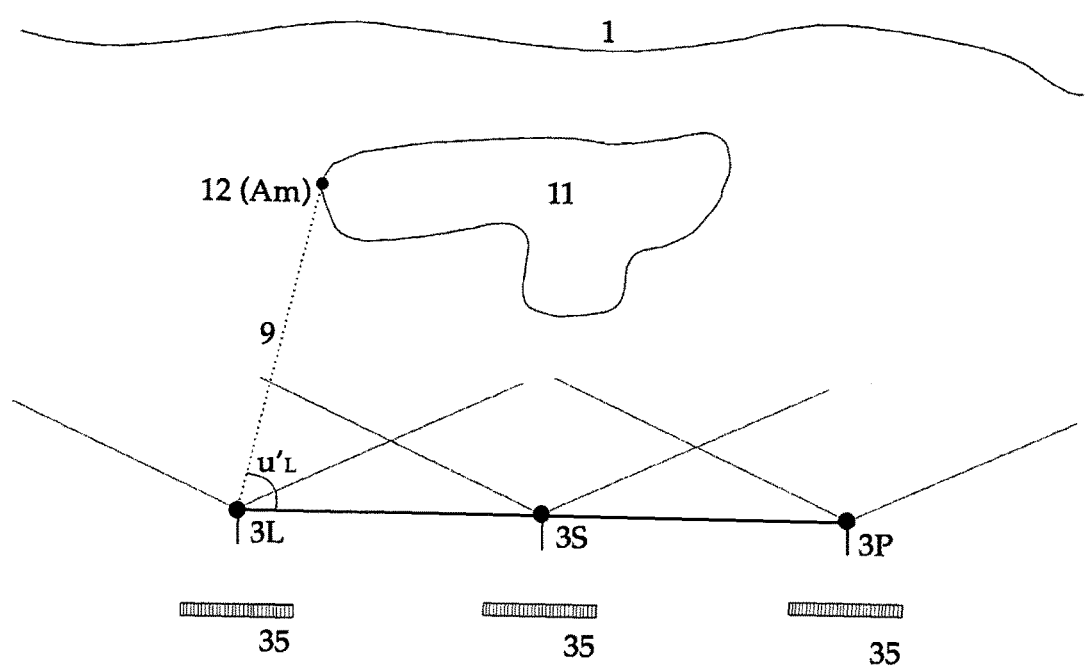
Figure 8:
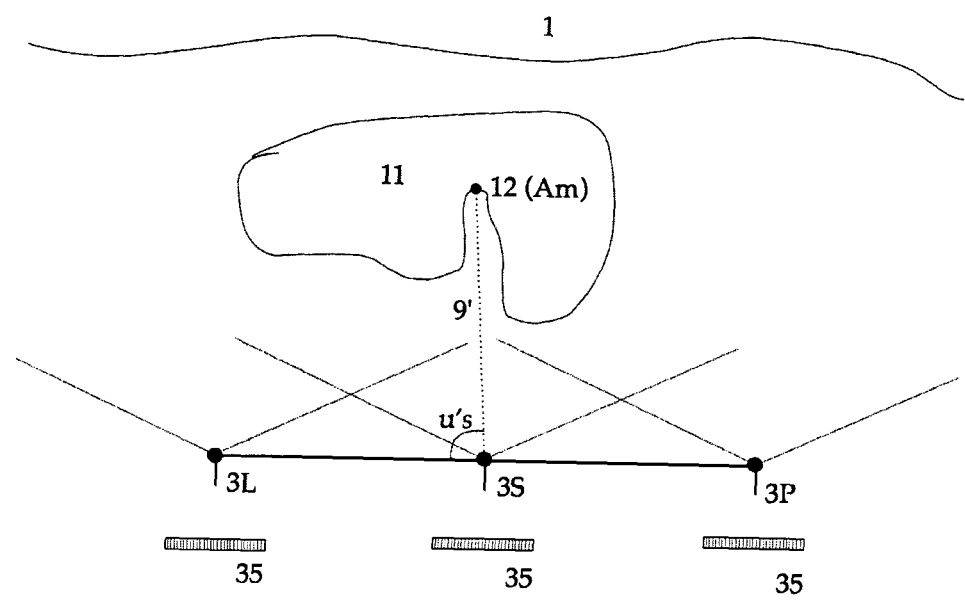
Figure 9:
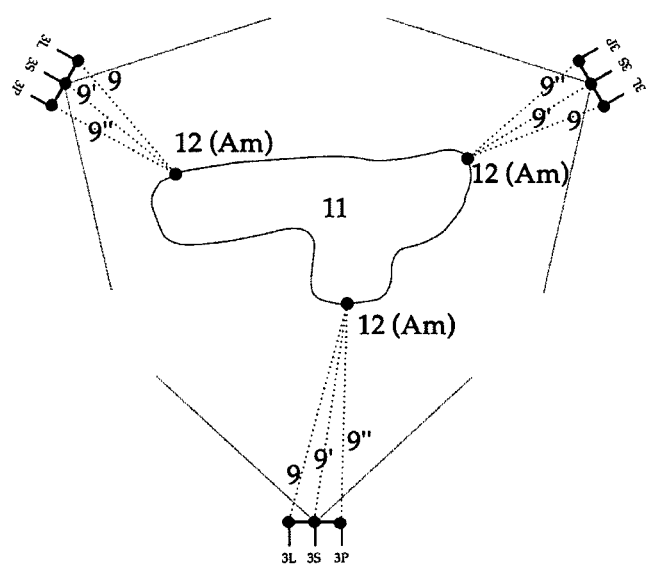
Figure 10:
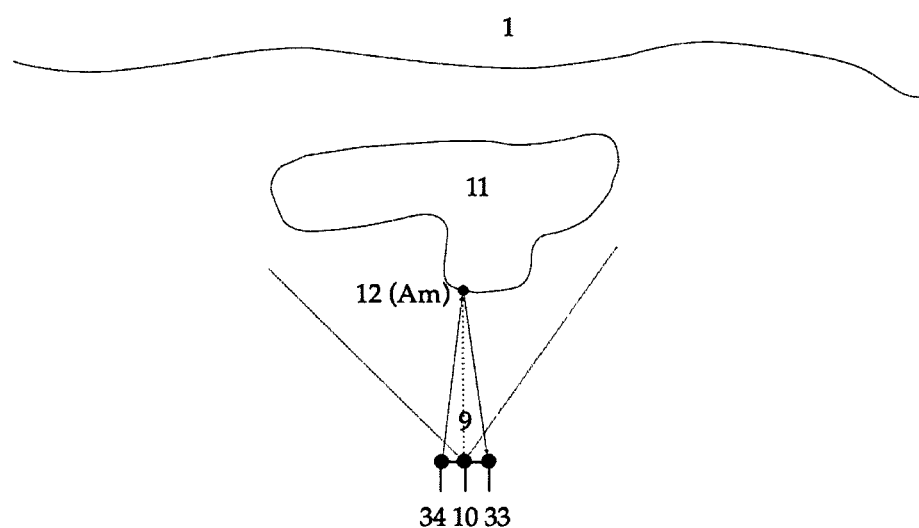
Figure 11:
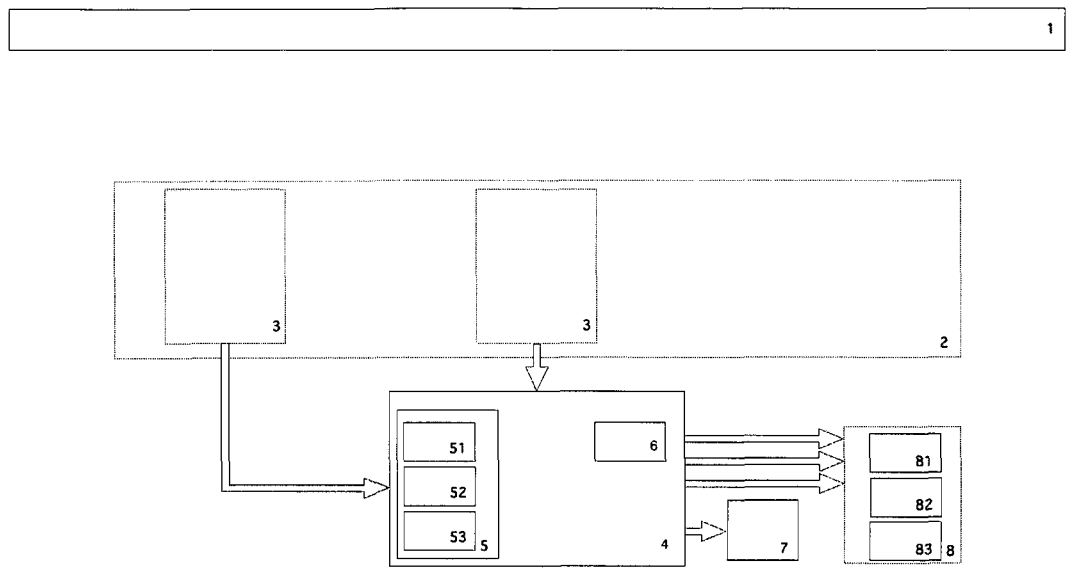
Figure 12:
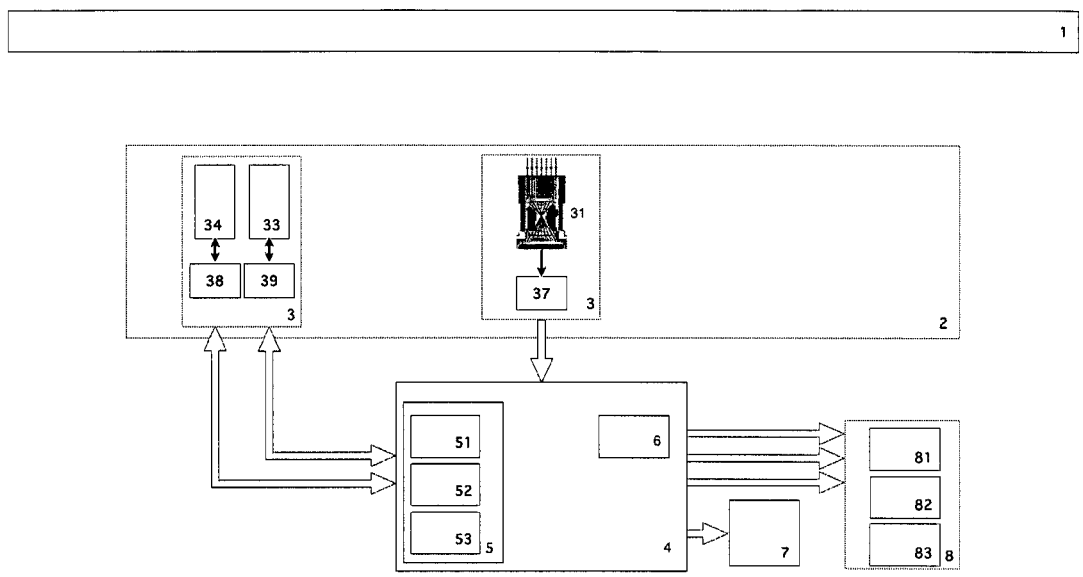
Figure 13:
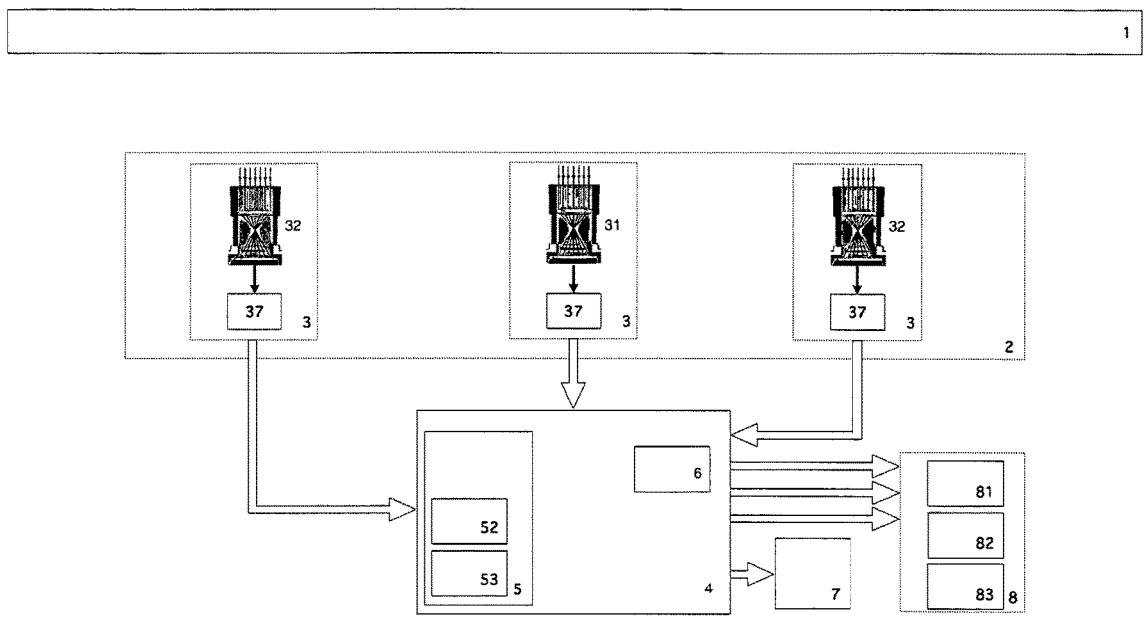
Figure 14:
Figure 15:
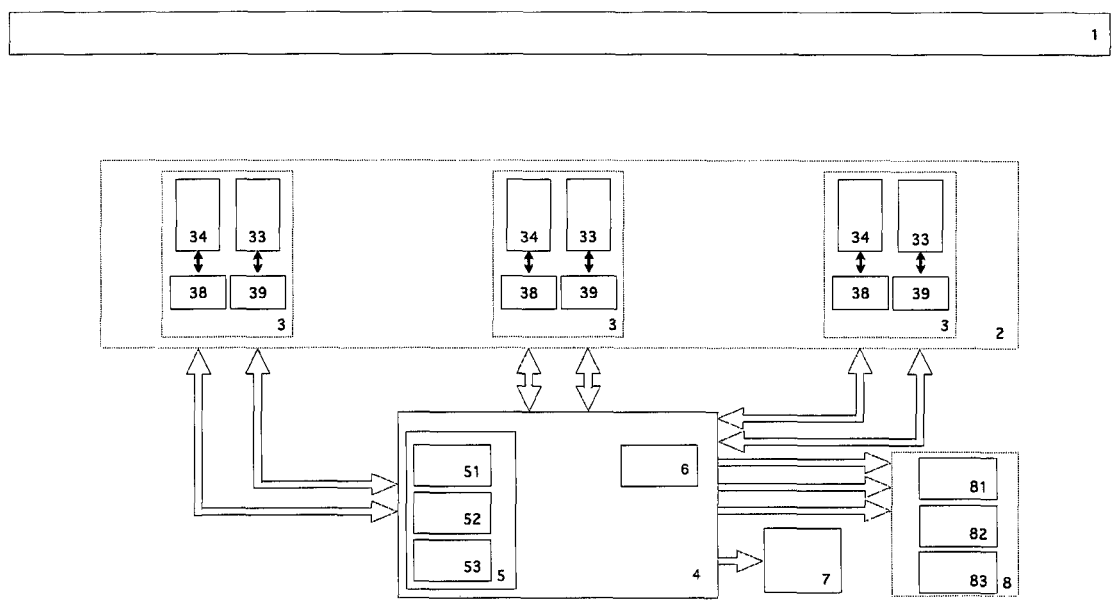
Figure 16:
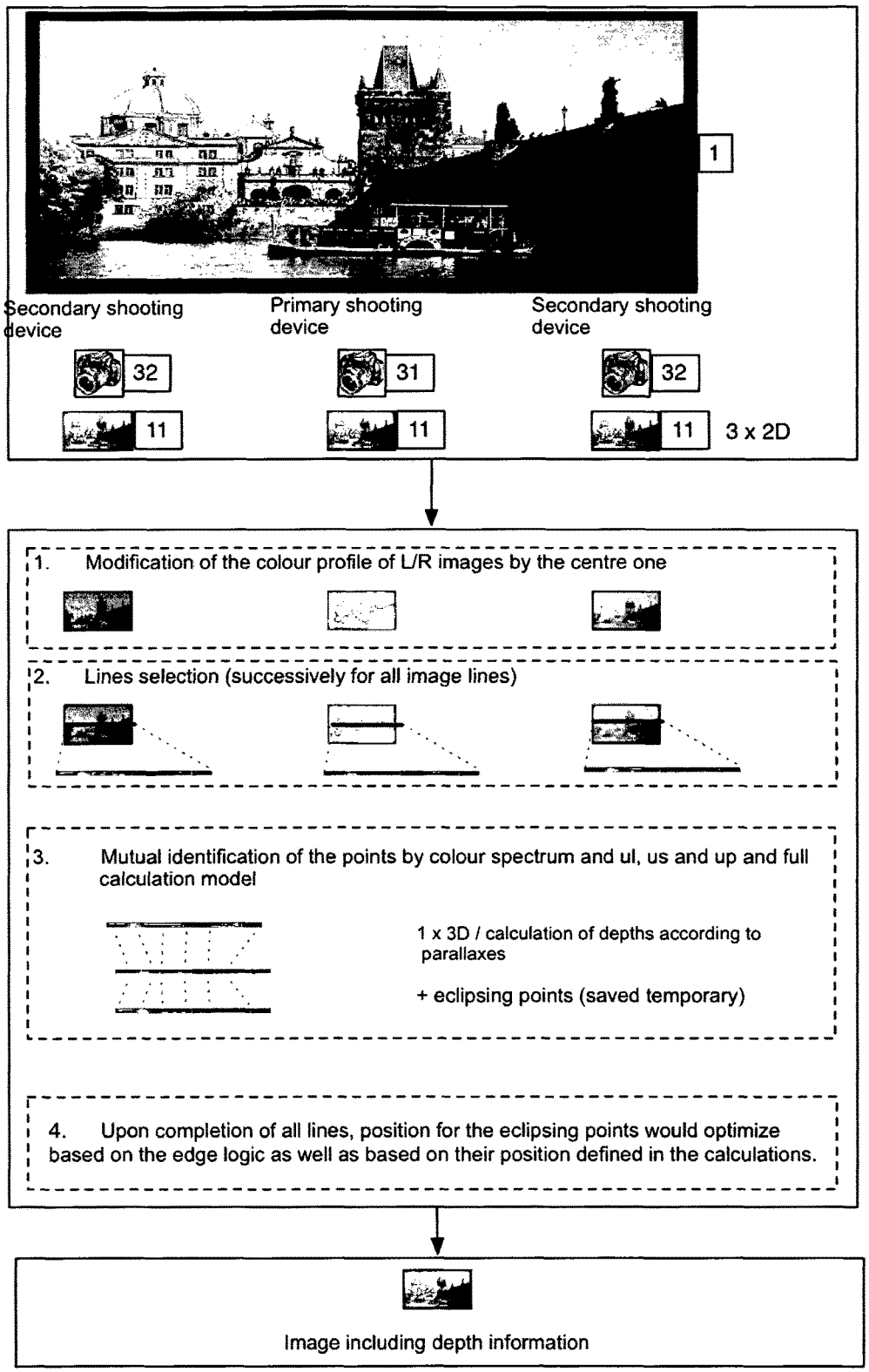
Figure 17:
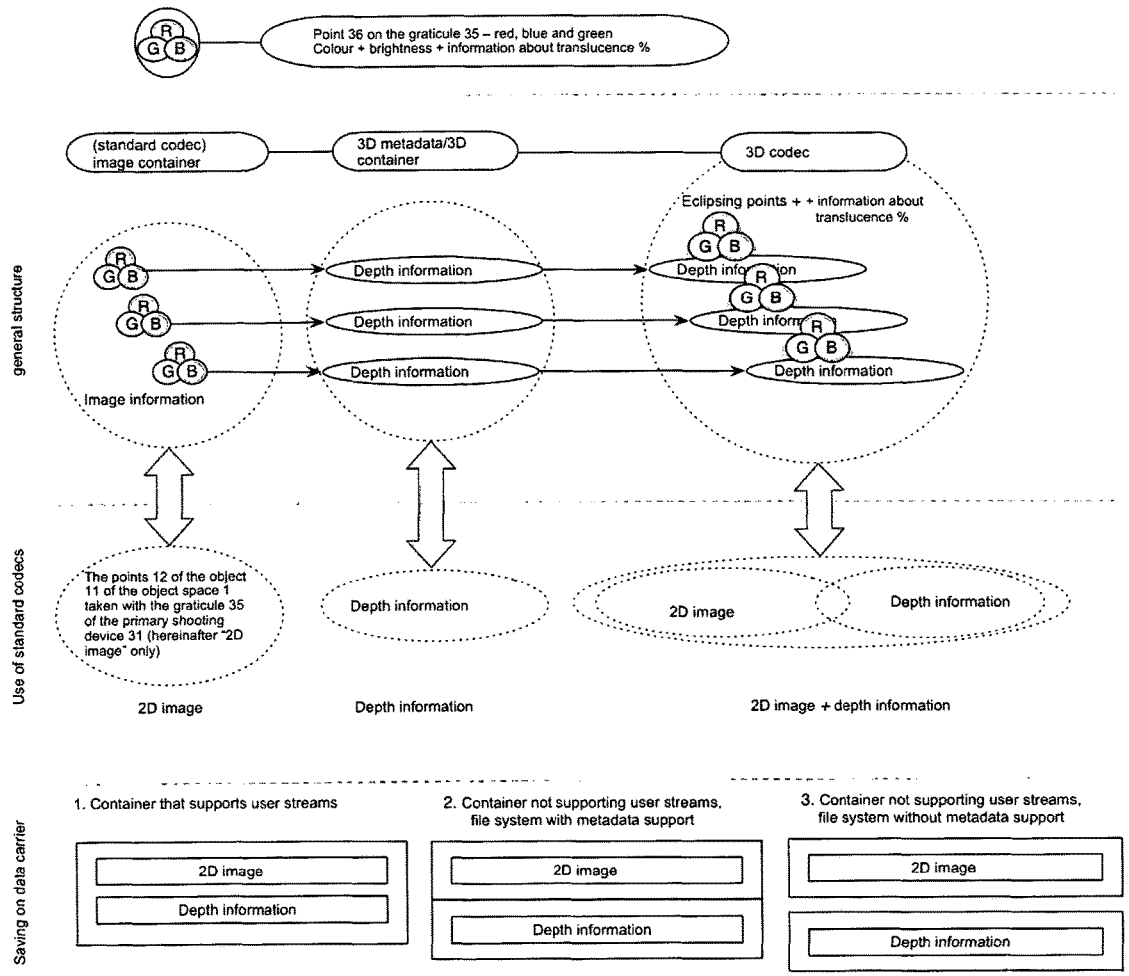
Figure 18:
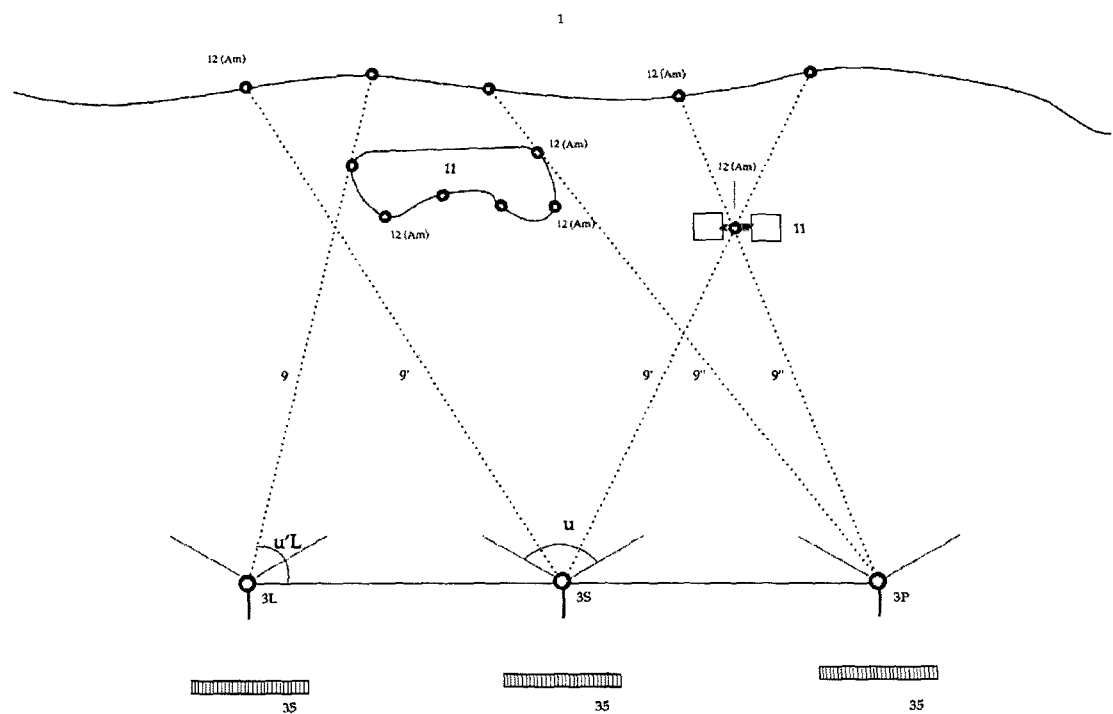
Figure 19:
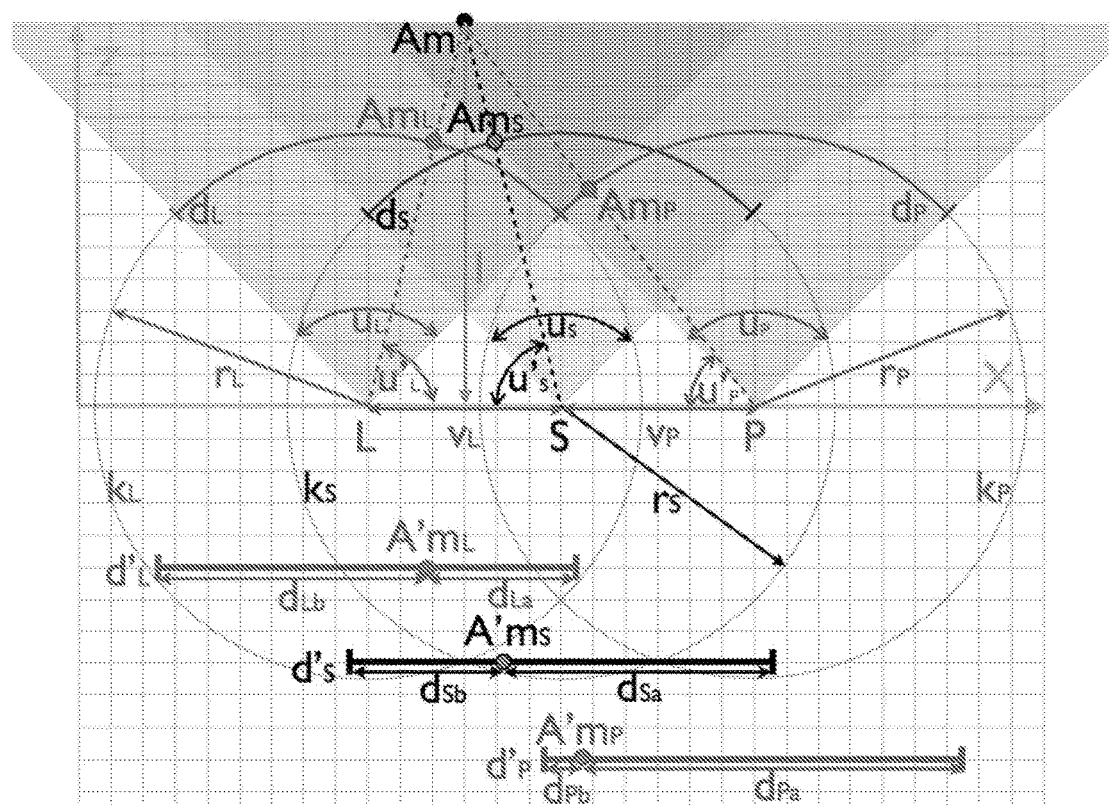
Figure 20:
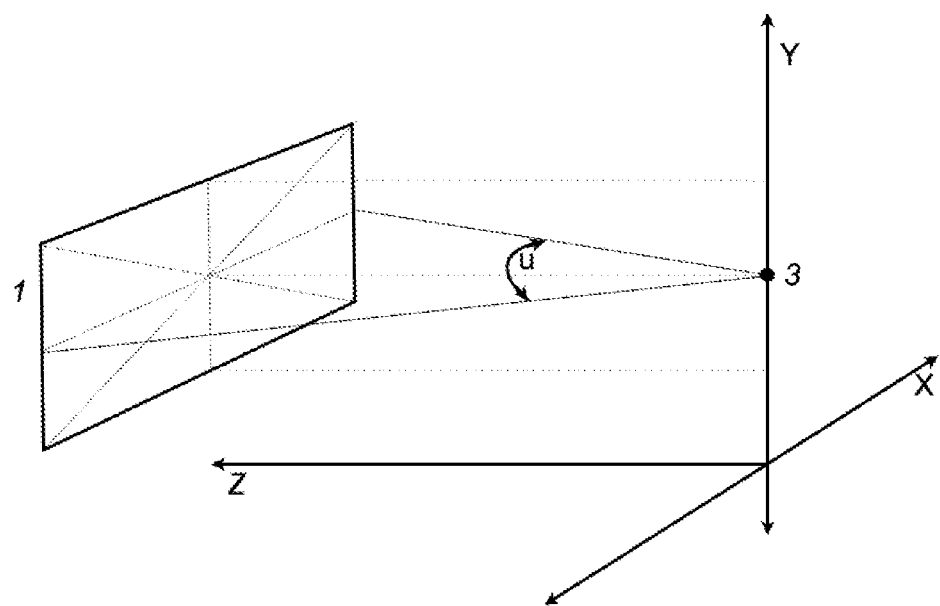
Figure 21:
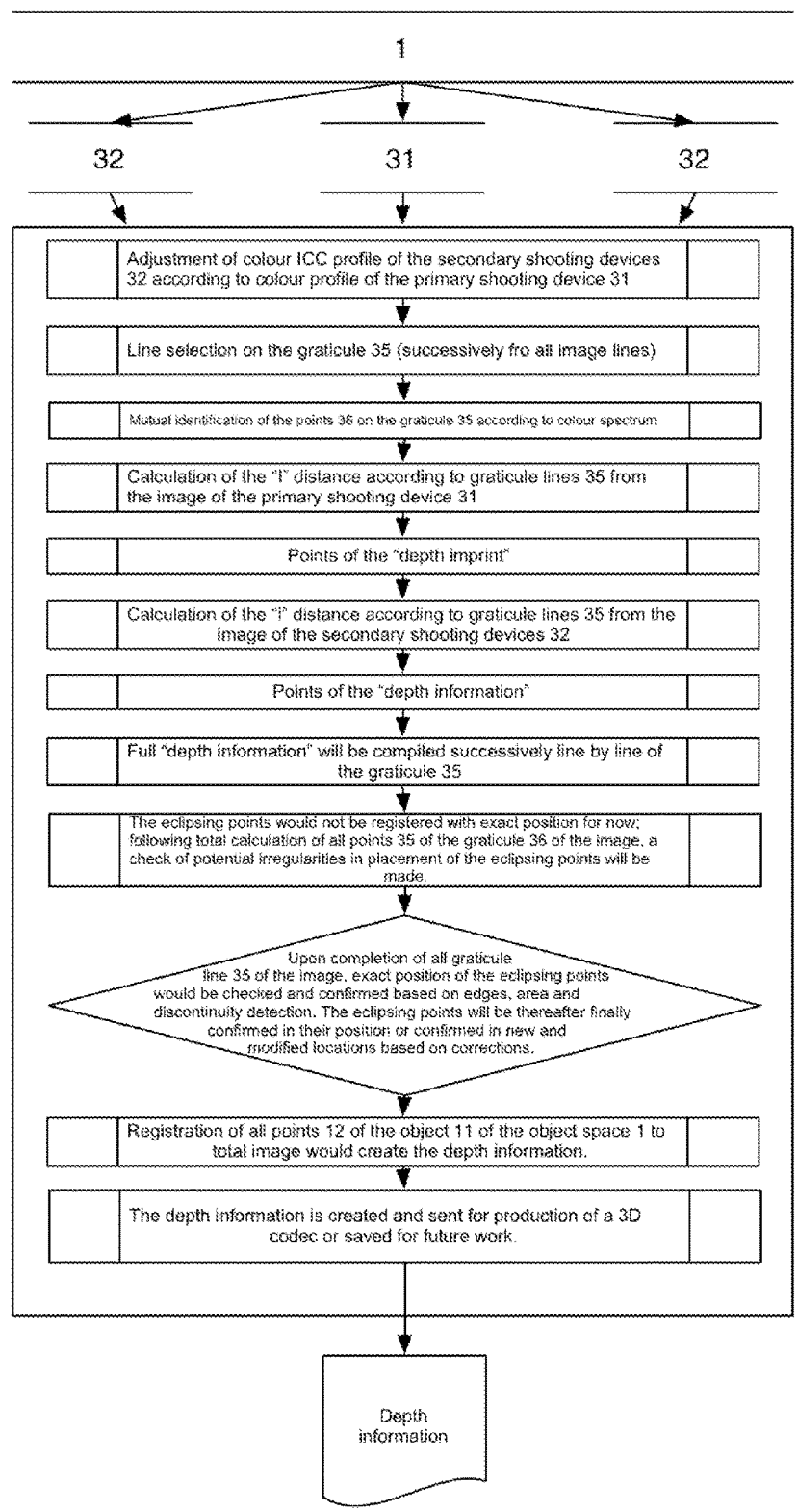
Figure 22:
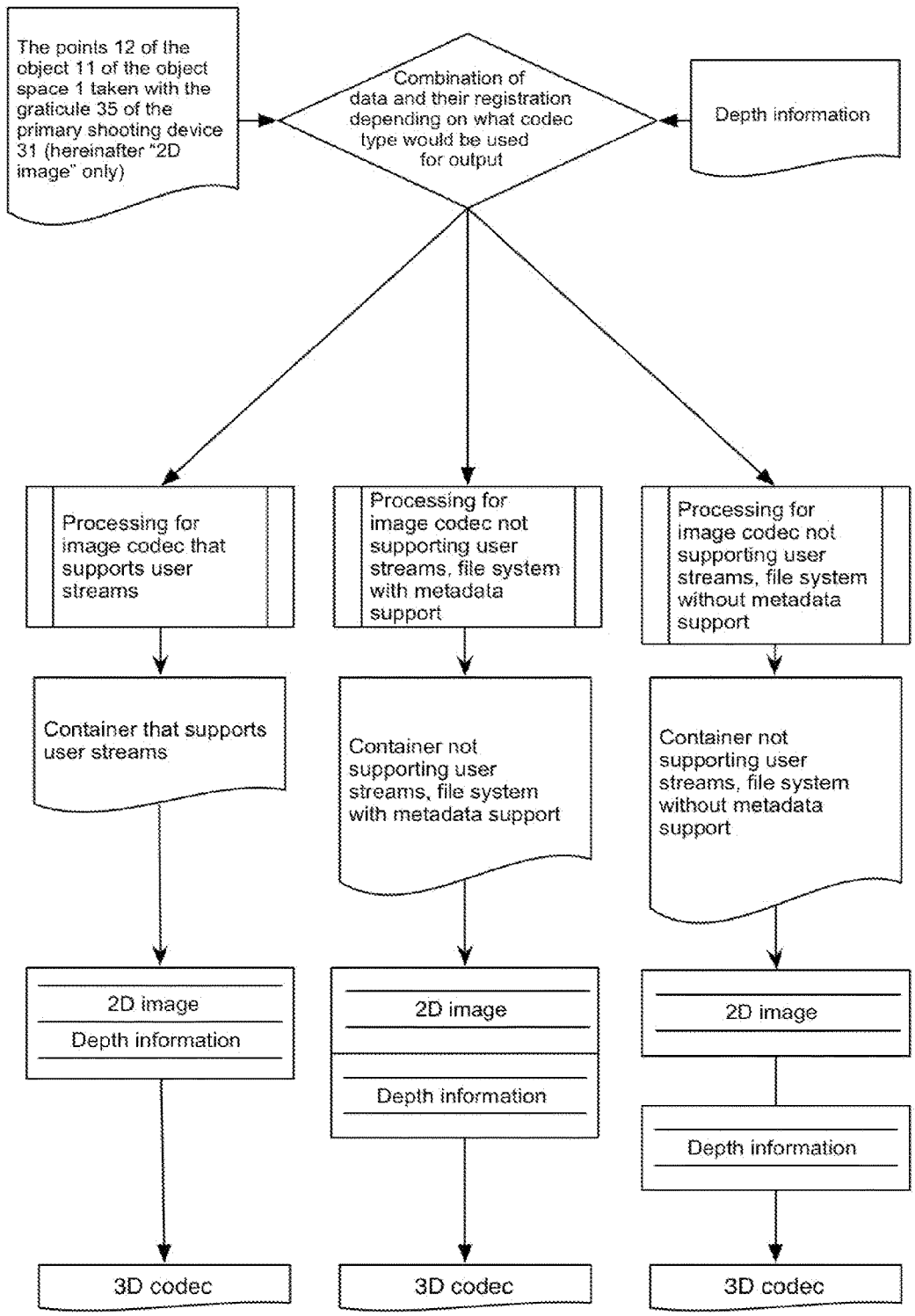
Figure 23:
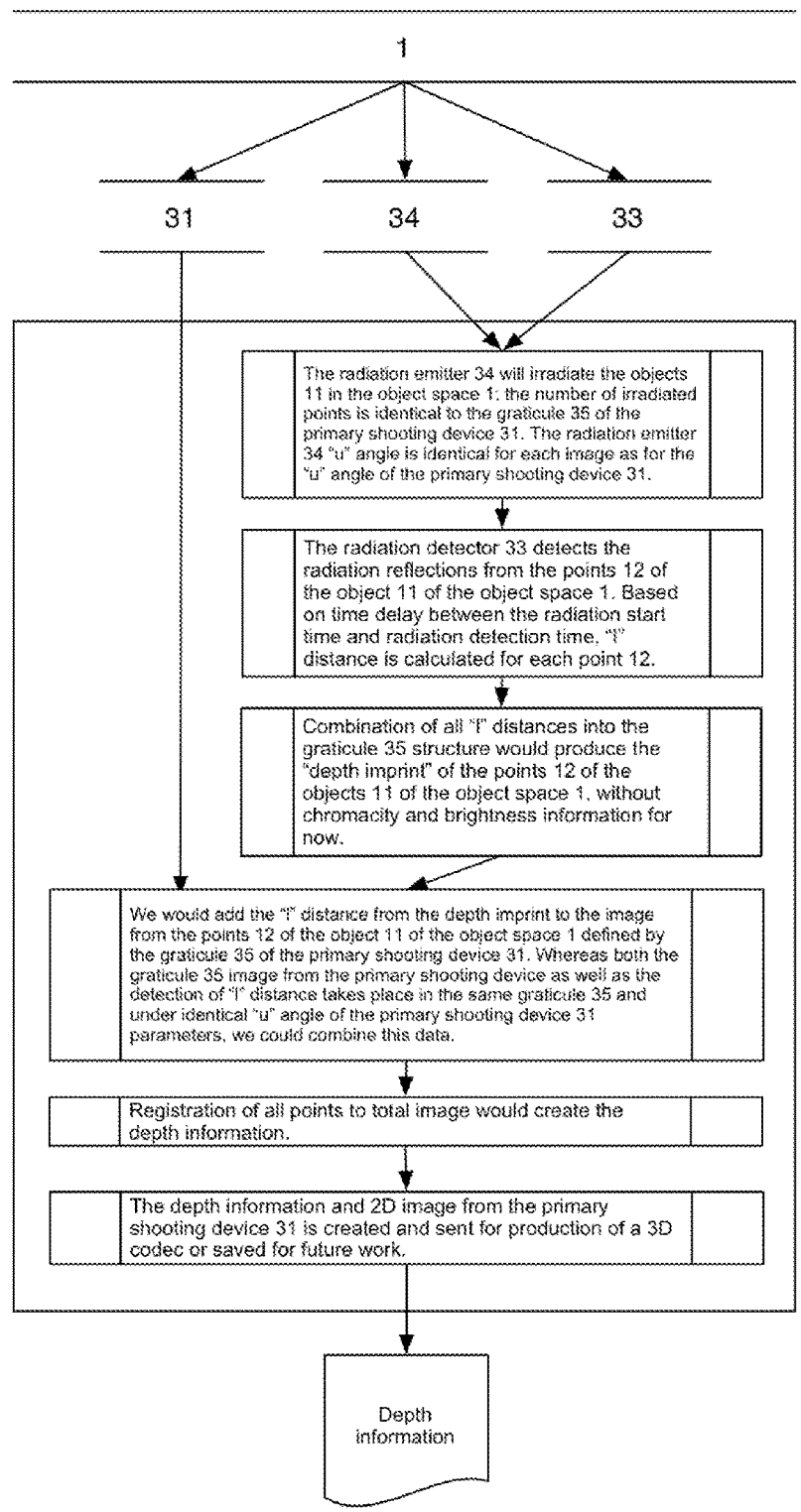

The invention will be explained using drawings, where
FIG. 1 shows selected point of image graticule of a scanning device,
FIG. 2 shows "l" distance of a specific graticule point, portrayed using "z" coordinate,
FIG. 3 shows the graticule point of a scanning device and "z" coordinate assigned with indication of specific "l" distance of the object point of the object space,
FIG. 4 shows the graticule point of a scanning device and "z" coordinate assigned with indication of specific "l" distances of the first and second object point of the object space,
FIG. 5 shows the object point of the object space visible by three scanning devices,
FIG. 6 shows the object point of the object space visible by two scanning devices,
FIG. 7 shows the object point of the object space visible by one secondary scanning device,
FIG. 8 shows the object point of the object space visible by the primary scanning device,
FIG. 9 shows the object point of the object space visible by the system of three scanning devices arranged against each other at 120° interval,
FIG. 10 shows the object point of the object space visible by the primary scanning device and radiation detector and emitter, FIG. 11 shows basic block diagram of connection of the scanning system covering two scanning devices and connection of CPU with relevant service blocks, FIG. 12 shows block diagram of connection of the scanning system, where the scanning device is the primary scanning device consisting of a camcorder and at least one secondary scanning device consisting of a radiation emitter and a radiation detector, FIG. 13 shows block diagram of connection of the scanning system, where the scanning device is the primary scanning device consisting of a camcorder, FIG. 14 shows block diagram of connection of the scanning system, where the primary scanning device is the primary scanning device consisting of a camcorder and the secondary scanning device consists of both a camcorder and radiation emitter and detector, FIG. 15 schematically shows block diagram of connection of the scanning system, where the primary scanning device and secondary scanning device consist of a radiation emitter and detector, FIG. 16 shows one embodiment of the assignment of identification of individual points of the image graticule on individual lines using the application software, FIG. 17 shows 3D codec and the method of its registration based on what of three codec types would be used for combination with the "depth information", and FIG. 18 shows the object points of the object space shot by a system of three scanning devices arranged at a certain distance from each other. Calculation of the depth information is shown in FIG. 19. Scanning angle definition "u" is shown in FIG. 20. The block diagram showing how depth information is determined is shown in FIG. 21. The 3D codec block diagram is shown in FIG. 22. The block diagram for calculation of the depth information using the primary scanning device and the secondary scanning device consisting of the radiation emitter and detector is shown in FIG. 23.

EXAMPLES OF EMBODIMENT OF THE INVENTION

The invention will be explained in detail using the invention embodiments. Obviously, these examples are an indicative embodiment of application of principles behind this invention.

For the purpose of description of method and connection for implementation thereof according to this invention, we hereby give the following definition of terms used herein below in the following description.

Definition of terms used, whereas we work in 2D at the moment of scanning and use the following terms:

Scanning device—a device that scans the object space using image sensors and then records obtained data about the object space for the purpose of storing, processing or imaging of obtained data (by the scanning device within the definition of this invention may for example be a camera, camcorder, X-ray device, emitter and detector system and/or similar devices of this type)

Image sensor—an electronic component (e.g. CCD chip or CMOS) consisting of a set of elements sensitive to light, arranged in a graticule that convers incident light radiation into electric signal Scanning device graticule—within this invention, a network of elements of the image sensor sensitive to light. Typically, these elements sensitive to light are arranged into a grid and the values shot by the elements are arranged in matrices during processing.

Element sensitive to light—the smallest scanning unit of a image sensor, which captures image information about a section of the subject space (the smallest graticule unit)

Object space—the space located in front of lenses of a scanning device. Shot objects are located in the object space. These objects may overlap or hide each other or they may be variously broken. They may be of different colour and translucence. Each object is characterized by its chromacity and translucence.

Section of the object space—a part of the subject space captured by the element of the scanning device sensitive to light Image/frame—a representation of shot object space by a group of points of the image bearing image information.

Image point (pixel)—the smallest image (frame) unit with image information (colour and brightness), which represents a section of the object space captured by one element of the scanning device graticule sensitive to light. Number of image points corresponds to the number of the scanning device (image sensor) graticule elements sensitive to light. We add the following terms for processing and conversion into 3D:

Depth imprint of the object space—a set of "l" distances assigned to the image points (for which only brightness and colour information was known to date) from objects in the sections of the object space represented by them to the plane of the image sensor of the scanning device. These distances are obtained e.g. by triangulation during processing of at least two images taken from two different scanning devices. Just one distance is assigned to each image. Should the section of the object space include multiple objects characterized by their chromacity and translucency, where some of them are fully covered from the view of the image sensor or they are visible to a partial extent only thanks to translucence of closer objects, the image point gets the object distance assigned from this section of the object space being located as closest to the image sensor or the plane of the image sensor of the scanning device. In fact, the depth imprint therefore determines a shell of the object space.

Depth imprint point—a representation of an object from component part of the object space located closest to the image sensor or the plane of the image sensor of the scanning device.

Eclipsing point/eclipsing point of depth imprint point—in the sense of this invention, a representation of an object from component part of the object space located behind the depth imprint point in the section of the object space, i.e. located at the distance from the plane of image graticule of the scanning device exceeding the distance of the object from the component part of the object space located as closest to the plane of the image graticule of the scanning device. The point is defined by "l" distance from plane of the image graticule of the scanning device or from a specific point (depth imprint point or eclipsing point) behind which it is located, brightness and colour information or translucency. The number of these points is unlimited.

Depth information—created by combination of depth imprint and information about eclipsing points. Hence, the depth information includes a lot of information required to identify individual objects in the object space and their placement within the object space, colour, brightness and translucency at the moment of scanning of the object space.

3D codec—for the purpose of this invention, a standard codec+information about depth information for each image point. Or data about depth information for other points on the "z" axis that define "l" distance of individual points from the scanning device with registration of their distances "l" on the "z" axis and brightness and chromacity information. Chromacity information—for the purpose of this invention, information about colour of said point View line—for the purpose of this invention, a line crossing Am and L or Am and P or Am and S points.

Generally, the method for description of the points 12 of the object 11 of the object space 1 according to this invention rests in the following steps. The first step is that for each object 11 registered in 2D format located in the object space 1, depth information about its distance is registered for each of its point at the same using at least two scanning devices 3 arranged in a certain distance from each other and the second step is that the information produced in this way is stored to each image as additional data. As mentioned above for the object space 1, e.g. image registered in 2D format, the depth imprint is added to the registered information about individual points 12 of the object—image from the object space 1.

The fundamental arrangement of connection for the method according to this invention, which is scanning of individual points 12 of the object 11 located in the object space 1, is shown on FIG. 11. Connection in this arrangement includes a scanning system 2 that includes at least two scanning devices 3. The scanning devices 3 are connected to inputs of the central processing unit 4 (hereinafter "CPU" only). CPU 4 integrates block of software applications 5, which includes software application 51 for the radiation emitter 34 and detector 33 control and software application 52 for scanning devices 3 control and software application 53 for evaluation of points 36 of the graticule 35 and block of calculation module 6 with software application 61 is integrated as well. In addition, CPU 4 has some of its inputs connected to the block 7 of internal memory and/or removable memory and to block 8 of online outputs.

Communication between the scanning system 2 and the CPU 4 is described below. Shot data is brought from the scanning system 3 via calculation modules of radiation emitter 38 and detector 39 and/or image processors 37 to CPU 4 inputs and the latter communicates via the block of software applications 5 contained therein, software application 51 for communication with the radiation emitter 38 and detector 39 and/or radiation detector 12, software application 52 for communication with image processors 37 of the primary scanning device 10 and/or secondary scanning device 11 and software application 53 for evaluation of points 36 of the graticule 35 as well as calculation module 6 for software application 61 for calculation of 3D codec. Using software application 53 for evaluation of points 36 of the graticule 35, mathematical calculation of the depth information is performed and then, this distance information is saved to each point 12 of the object 11 as additional data and the depth imprint is created. Then, 3D codec is calculated using the software application 61 for calculation of 3D codec and written as additional data to a file and the 3D codec must be used to repeated imaging the file with additional data.

Another possible connection of the scanning system 2 for 3D scanning of the object 11 of the object space 1, e.g. shot image according to this invention, is shown on FIG. 13. The purpose of this connection is getting the depth information including definition of points 12 of the object 11 located outside angle of the primary scanning device 31 but visible by the secondary scanning device 32. Connection of the scanning system 2 in this arrangement contains three scanning devices 3, where one of them is the primary scanning device 31, so-called central one and two secondary scanning devices 32, so-called lateral one. The scanning devices 3 of the scanning system 2 are again connected to CPU 4 inputs. CPU 4 integrates block of software applications 5, which includes software application 52 for the scanning devices 3 and software application 52 for scanning devices 3 control and software application 53 for evaluation of points 36 of the graticule 35 and block of calculation module 6 with software application 61 is integrated as well. In addition, CPU 4 has some of its inputs connected to the block 7 of internal memory and/or removable memory and to block 8 of online outputs.

This is one of possible embodiments. In practice, a different number of secondary scanning devices 32 may be used and they do not need to be installed on the same plane on a single axis with the primary scanning device 31. However, it is necessary to have information about their mutual position in the space delimited by X, Y and Z coordinates. Furthermore, it is necessary to know the scanning angle "u" of the scanning devices 3 and the take angle "u" of the scanning devices 3 that sense the objects 11 in the object space 1. Here, it must be known whether the view direction on the shot object space 1 using secondary scanning devices 32 either identical or different from the view direction to the object space 1 of the primary scanning device 31 and if different, by how many angles and in what direction. It applies to all conditions that the procedure for identification of the points 12 of objects located in the space and subsequent production of the depth information is identical. Quantity of data being processed changes only in case of different number of the secondary scanning devices 32 and depending on their placement within the space. The calculation principle does not change here, only some new values and formulas, which correct mutual position of the scanning devices 3, will be added.

The scanning system 2 can be used with a pair or two pairs or with multiple secondary scanning devices 32 arranged in various distances from the central primary scanning device 31. In this way, substantially deeper view is achieved and this may be rotated and edited during processing or projection. Based on knowledge of placement of each point 36 of the graticule 35 of the primary image, which is imaging of points 12 of the object 11 of the object space 1 and all points 36 of the graticule 35 of the secondary images, which are imaging of points 12 of the object 11 of the object space 1, a mathematical formula would allow calculation of distance of each individual image point from plane (axis) on which the scanning devices 3 are arranged.

Another method for description of the points 12 of the object 11 of the object space 1 via the scanning systems 2 is shown on FIG. 9. In this case, the scanning systems 2 are placed against each other at 120° intervals and in this arrangement (with at least 3 systems) it is possible to scan points 12 of the objects 11 in the object space 1 within 360° of their surface. We must know mutual position of the scanning systems 2 and the scanning angle "u" of these scanning systems 2 in this case. Each of the scanning systems 2 placed like this records an image from the primary scanning device 31 and the depth information. One of these scanning systems 2 we have selected is defined as the primary scanning system 2 of the full group of the scanning systems 2. The following data is added to the primary scanning device 31 image for that scanning system we have defined as the primary scanning system 2: the depth information from this agglomeration of the scanning systems 2. It means that the image from the primary scanning device 31 from the primary scanning system 2 is completed with the depth information that contain image data for points 12 of the objects 11 in the object space from multiple points up to 360° view.

Should the scanning device 3 be fitted with zoom-allowed lenses, the zoom is characterized as proportion of the longest possible focal distance of the lenses to the shortest one. Hence, zooming is based on the lenses with ability to adjust focal distance of so-called zoom lenses or pancratic lenses. Optical zoom is change to the focal distance of lens made based on shifting of the lens. Change to the focal distance is achieved by rearranging of individual optical members in the lens of the scanning device. In doing so, individual optical groups move on spiral lines with certain gradient and move against each other thereby. Here, two embodiments for the zoom function are obvious. For the first embodiment, where the primary scanning device 31 only is fitted with the zoom feature, zoom information is transferred to CPU 4 by communication with the software application 53 for evaluation of points, whereas the secondary scanning devices 32 have their scanning angle "u" unchanged. Mathematical processing using the software application make all shot data in conformity with the focal distance (zoom) of the primary scanning device 31.

For the second embodiment, the secondary scanning devices 32 will be fitted with zoom feature as well. Zoom may be either optical (see above) or digital.

Another embodiment for arrangement of the scanning system 2 for 3D scanning is shown on FIG. 14. The scanning system 2 of this embodiment includes the central primary scanning device 31 with the secondary scanning devices 32 on left hand and right hand side (e.g. a camcorder with the central lens and a pair of CCD sensors with lens arranged on both sides of the primary scanning device 31) and the secondary scanning device 32 with the radiation emitter 34 and detector 33, e.g. wave/particles emitter. The radiation emitter 34 and detector 33, installed in the secondary scanning devices 32, work either in the counter-tact mode or at different frequency. The radiation emitter 34 and detector 33 measure the distance of individual points 12 of the object 11 at the same time.

Shot distance data for individual points 12 of the object 11 are mathematically processed using the software application 53 for evaluation of points and assigned to individual image points. This embodiment improves calculation of the "depth information". Distance additionally measured by the radiation emitter 34 and detector 33 is used as a check of calculation and eliminates potential calculation errors. The depth information for each image point of the primary scanning device 31 is then registered in the codec using the software application 53 for evaluation of the points.

Another embodiment with arrangement of the scanning system 2 is connection of the scanning devices 3 to the radiation emitter 34 and detector 33, e.g. waves/particles emitter. This scanning system 2 can be used directly also outside the visible image spectrum, see FIG. 15. This is a condition when it is necessary to scan the objects 11 in the object space 1 under conditions where there is no visible spectrum radiation or the radiation is weak enough to allow writing of the chromacity information and despite that, it would be necessary to produce the depth information even without the chromacity information. Should we use one scanning device 3 fitted with the radiation emitter 34 and detector 33 as primary and at least two scanning devices 3 fitted with the radiation emitter 34 and detector 33 as secondary, we can produce depth information containing all data except for chromacity, brightness and translucence data.

A specific embodiment is arrangement of the scanning system 2 for scanning of the objects 11 of the object space 1 with the use of a mobile phone or a tablet; see FIG. 12 as the scanning device 3 for scanning of the object 11. The scanning system 2 consists of two scanning devices 3. Connection of the scanning system 2 in this embodiment contains only two scanning devices 3, one of them is the primary scanning device 31, so-called central, consisting of camcorder and the second is the secondary scanning device 32, so-called lateral one, consisting of the radiation emitter 34 and detector 33, for example waves/particles emitter.

On one side next to the lens in the axis of their centre or off-centre (in the latter case, mathematic correction of the position must be included as well), there is the radiation emitter 34, e.g. sweep laser, powerful IR or UV diode or any other type of waves/particles emitter. On the other side of the lens, there is the radiation detector 33 to scan the radiation reflections emitted by the radiation emitter 34. Here, individual calculation modules of the radiation emitter 38 and detector 39 calculate time delay between the outputting and inputting radiation beam and time delay information obtained in this way will be calculated in CPU 4 using the software application 51 and based on this, distance to 2D scene shot by the primary scanning device 31 will be assigned. The scanning system 2 like this is an integral part of a mobile phone or a tablet. This data will be registered in 3D codec. Owing to that we would be able to achieve taking of a 3D scene using a device such as a mobile phone or a tablet for subsequent processing. This embodiment is applicable to very cheap hand camcorders where it would not be feasible for economic reasons to use one primary scanning device 31 and at least one secondary scanning device 32.

The method of description of the points 12 of the object 11 from the object space 1 according to this invention can be e.g. implemented using connection of the scanning system 2 shown on FIG. 13. All three scanning devices 3 are precisely located on the same plane, here defined by axes y and x, containing α and β angles with z axis, whereas the angles α and β preferably form 90° angle with z axis. In this case, the scanning device 3 consists of the primary scanning device 31, two secondary scanning devices 32 located on the left hand and right hand side of the primary scanning device 31 at equal distance from the primary scanning device 31. We know mutual position of all three scanning devices 3. The scanning devices 3 synchronously scan the object space 1. In this case, three images of the objects 11 in the object space 1 are taken, whereas one of the images, so-called primary, is taken by the primary scanning device 31, so-called central one and two more images, so-called secondary, are taken by left hand and right hand secondary scanning device 32. The secondary images are shifted with respect to the reference image. The points 36 of the graticule 35 are counted using mathematical procedures of shown calculation schemes where first of them shows the calculation scheme for calculation and assignment of "l" distance to individual points 12 of the object 11 of the object space 1.

Terms and symbols used for explanation of calculation of the depth information on the FIG. 19 are defined below:

Am—any point 12 in the object space 1 being shot, where "m" is any integer number S—scanning device 3—for the purpose of this scheme, its size is defined as indefinitely small (point)

L—scanning device 3—(located on the left hand side from at least two more scanning devices in our technological set); for the purpose of this scheme, its size is defined as indefinitely small (point)

P—scanning device 3—(located on the right hand side from at least two more scanning devices in our technological set); for the purpose of this scheme, its size is defined as indefinitely small (point)

S, L and P rest on X axis

I—the shortest distance of Am point from X axis uS—scanning angle of the S scanning device, uS angle axis is identical to straight line coming through S point being perpendicular to X axis at the same time uL—scanning angle of the L scanning device, uL angle axis is identical to straight line coming through L point being perpendicular to X axis at the same time uP—scanning angle of the P scanning device, uP angle axis is identical to straight line coming through P point being perpendicular to X axis at the same time kS—circle with S centre and rS radius kL—circle with L centre and rL radius kP—circle with P centre and rP radius d'S—dimension of digital imaging of the object space 1 (result of which is e.g. a photograph) according to X axis in the coordination system within our schemes, whereas the object space was shot by the S scanning device d'L—dimension of digital imaging of the object space 1 (result of which is e.g. a photograph) according to X axis in the coordination system within our schemes, whereas the object space was shot by the L scanning device d'P—dimension of digital imaging of the object space 1 (result of which is e.g. a photograph) according to X axis in the coordination system within our schemes, whereas the object space was shot by the P scanning device A'mS—Am point shown in the imaging of the object space 1 (e.g. on photograph), whereas the object space 1 was shot by S scanning device A'mL—Am point shown in the imaging of the object space 1 (e.g. on photograph), whereas the object space 1 was shot by L scanning device A'mP—Am point shown in the imaging of the object space 1 (e.g. on photograph), whereas the object space 1 was shot by P scanning device dS—a section of kS circle, whereas dS length equals to d'S and at the same time, the end points dS rest on the arms of uS angle and at the same time, at least one inner dS point rests in the circular section defined by the S centre and uS angle dL—a section of kL circle, whereas dL length equals to d'L and at the same time, the end points dL rest on the arms of uL angle and at the same time, at least one inner dL point rests in the circular section defined by the L centre and uL angle dP—a section of kP circle, whereas dP length equals to d'P and at the same time, the end points dP rest on the arms of uP angle and at the same time, at least one inner dP point rests in the circular section defined by the P centre and uP angle AmS—point, being dS crossing point and straight line coming through Am and S points AmL—point, being dL crossing point and straight line coming through Am and L points AmP—point, being dP crossing point and straight line coming through Am and P points vL—distance between S and L points vP—distance between S and P points u'L—angle contained by X axis with the straight line, coming through Am, AmL and L points u'S—angle contained by X axis with the straight line, coming through Am, AmS and S points u'P—angle contained by X axis with the straight line, coming through Am, AmP and P points Calculation of "I" distance:

"o" is length of circle

"r" is radius of circle

"pi" is Ludolphian number

"u" is scanning angle

"d" is length of section of the circle belonging to the section that are defined by the arms of scanning angle (which is the central angle of said circle) then, the following generally applies:

$$o = 2 \times \text{pi} \times r$$

$$d = (u \times \text{pi} \times r)/180$$

$$r = (180 \times d)/(u \times \text{pi})$$

and for our scheme:

$$dS = (uS \times \text{pi} \times rS)/180$$

$$dL = (uL \times \text{pi} \times rL)/180$$

$$dP = (uP \times \text{pi} \times rP)/180$$

$$dS = D'S, dL = d'L, dP = d'P$$

$$dS = dSa + dSb, dL = dLa + dLb, dP = dPa + dPb$$

$$rS = (180 \times dS)/(uS \times \text{pi})$$

$$rL = (180 \times dL)/(uL \times \text{pi})$$

$$rP = (180 \times dP)/(uP \times \text{pi})$$

$$u'S = ((180 - uS)/2) + ((dSa + 180)/(rS \times \text{pi}))$$

$$u'S = ((180 - uS)/2) + ((dSa \times 180)/(((180 \times dS)/(uS \times \text{pi})) \times \text{pi}))$$

$$u'S = ((180 - uS)/2) + ((dSa \times uS)/dS)$$

$$u'L = ((180 - uL)/2) + ((dLa \times 180)/(rL \times \text{pi}))$$

$$u'L = ((180 - uL)/2) + ((dLa \times 180)/(((180 \times dL)/(uL \times \text{pi})) \times \text{pi}))$$

$$u'L = ((180 - uL)/2) + ((dLa \times uL)/dL)$$

$$u'P = ((180 - uP)/2) + ((dPa \times 180)/(rP \times \text{pi}))$$

$$u'P = ((180 - uP)2) + ((dPa \times 180)/(((180 \times dP)/(uP \times \text{pi})) \times \text{pi}))$$

$$u'P = ((180 - uP)/2) + ((dPa \times uP)/dP)$$

$$I = vL/(\cot g(u'S) + \cot g(u'L))$$

or $$I = vP/(\cot g(u'S) + \cot g(u'P))$$

where the second of them shows "u" scanning angle definition.

Referring to FIG. 20, in our documentation, "u" scanning angle of scanning device 3 is the angle axis of which goes through the scanning device 3, which is for the purpose of this scheme defined as a point and at the same time, the plane created by the angle axis and angle arms is perpendicular to the plane created by projection of the shot section of the object space 1. Moreover, the straight line coming through the crossing points of the scanning angle arms and the object space 1, which the scanning device 3 can capture, is parallel to horizontal axis of scanning device 3.

Thus, we have three images available based on which we can calculate distances using the software application 53 of each individual point 12 of the object of the object space 11, which is shot on the image from the plane (axis) where the scanning devices 3 are arranged, using the mathematical procedures represented by the calculation schemes and based on knowledge of placement of each point 36 of the graticule 35 of the reference central image on the secondary images.

The method of identification of individual points 12 of the object 11 of the object space 1, which is shown using the points 36 of the graticule 35 on individual lines of the image graticule 35, see FIG. 5 and FIG. 18, takes place via a sequence of steps depicted on the block diagram in FIG. 21.

Determination of the depth information is the result of the identification method.

All three images of this embodiment have identical point resolution, i.e. the graticule 35 of the primary scanning device 31 and the graticule 35 of the secondary scanning devices 32 are identical. The condition that all three images will be taken using the scanning devices 3 at the same time must be met.

Obviously, considering different optical and physical properties of individual scanning devices 3 arranged in the scanning system 2, individual images will have different colour presentation, i.e. different colour and brightness. Therefore, this disproportion must be eliminated when determining the "depth information" as the very first step. This is achieved by assigning ICC profile of the primary scanning device 31 to the profiles of the secondary scanning devices 32 to get a balanced colour presentation of all three images. An image taken by the primary scanning device 31 is always a reference image for colour matching.

In addition, the graticule 35 of the images taken by individual lines and points 36 of the graticule 35 are compared. This reveals how individual points 36 on individual graticule lines 35 of the images being compared are shifted against each other.

Comparison of the points 36 of the graticule 35 of individual images can be performed both in horizontal and vertical direction of the graticule 35 of the images. Let us assume for explanation of procedure described according to the invention in relation with this example that we will count horizontal lines for description of the calculation, starting from the first line up to the last line of the graticule 35 downwards.

At the time of taking each image by primary scanning device 31 and the secondary scanning devices 32, information about "u" scanning angle is registered as well for each scanning device 3 as obvious from the calculation schemes shown above. For the primary scanning device 31, the scanning angle is identified as "us", whereas for the secondary scanning devices 32, the scanning angle is identified by letters "uP". uL. Scanning angle data define what numbers of the focal distances need to be used in the calculation formulas. As soon as this information is read to CPU 4, the software application 53 for evaluation of points would use information about points 36 of the first line of the graticule 35 from the image shot by the primary scanning device 31. This is the reference image. Then, we would use information about points 36 of the first lines of the graticule 35 from images taken by right and left secondary scanning device 32. Obviously, chromaticity information has 16.7 million colours in standard mode. We would compare the colour profile of individual points 36 on these first three lines and reference data for comparison with other points 36 in the next first lines of the graticule 35 of the secondary images is data about points 36 from the first line of the graticule 35 of the image taken by the primary scanning device 31. Then, software application 53 for evaluation is employed to compare all image points of these three lines in CPU 4 whereas it is important that all data of points 36 from all three compared lines of the graticule 35 is under each other during calculation. The calculations resulting from the software application 53 for evaluation indicate by how many points 36 of the graticule on the graticule lines 35 the point 36 of the graticule of the same colour on the first line of the graticule 35 from the right and left secondary scanning device 32 is shifted to right or left with respect to data about points 36 of the reference line of the graticule 35, which is the first line of the graticule 35 of the image taken by the primary scanning device 31. This comparison of shift of the points 36 of the compared lines of the graticule 35 is performed point by point along the full line. Then, we would use the software application 53 for evaluation to calculate distances "l" on the "z" axis for the points 36 on the first line of the graticule 35 of the reference image from the primary scanning device 31. In this case, the points 36 of the first lines of the graticule 35 of the images from the secondary scanning devices 32 are used for determination of positions of individual points 36 shown on the image of the primary scanning device 31. In this way, we can calculate the "depth imprint" for these points 36 of the graticule 35.

For calculation of the depth information of individual points 36 of the graticule 35 we must perform identical calculation of distances for the points 36 on the first lines of the graticule 35 on the images taken by the secondary scanning devices 32, however, with calculation priority for distances of the point 36 of the graticule 35 of the first line 35 from the image from right secondary device 32 and then left secondary device 32. Whereas these scanning devices 3 scan the object space 1 from "u" scanning angle different in case of left secondary device 32, the scanning angle is identified as "$u_L$" and in case of right secondary device 32, the scanning angle is identified as "$U_P$". In this way we can put additional points 12 on the same "z" axis behind the points 36 of the graticule 35 of the line 35 for the image from the primary scanning device 31. These are the eclipsing points that complement the "depth imprint" with the "eclipsing point(s)". In this way we can get the "depth information" for a specific point 36 of the graticule 35 on the graticule line 35 for the reference image of primary scanning device 31. Using the method described above, all points 36 of the graticule 35 on the graticule line 35 are compared and all lines of the graticule 35 of the reference image will be processed equally.

For improved drawing of the points 36 of the graticule 35 on the graticule edge 35, it is favourable to use a larger graticule 35 for the secondary scanning devices 32. Should larger graticule be employed for the secondary scanning devices 31, the points 36 on the edges of the graticule 35 of the resulting image with "depth information" will be drawn much better.

For correct assignment of the eclipsing points 12 behind the reference image, which were visible by one scanning device 3 only, we would use the technology of "detection of edges, area and discontinuities". This is the procedure for calculation of the points 36 of the graticule 35 visible on the image from just one scanning device 3. The calculation of points 12 of the object 11 visible by only one scanning device 3 as obvious from FIG. 7 and of points 12 visible by the primary scanning device 31 as obvious from FIG. 8.

Calculation of point 12 of the object 11 of the object space 1 visible by three scanning devices 3, see FIG. 5

Calculation of point 12 of the object 11 of the object space 1 visible by two scanning devices 3, see FIG. 6

Calculation of point 12 of the object 11 of the object space 1 visible by one scanning device 3, see FIGS. 7 and 8.

The calculation of point 12 of the object 11 of the object space 1 visible by three scanning devices 3, where the link between point 12 and point 36 of the graticule 35 of the left and right central scanning device 3 forms the view straight lines 9, see FIG. 5. This procedure is identical to previous text aimed at calculation of points 12 on the "z" axis.

The calculation of point 12 of the object 11 of the object space 1 visible by two scanning devices 3, where the link between point 12 and the left and right central scanning device 3 forms the view straight lines 9, see FIG. 6. This procedure is identical to previous text aimed at calculation of points 12 on the "z" axis.

The calculation of point 12 of the object 11 of the object space 1 visible by one scanning device 3, where the link between point 12 (=Am) and left or central scanning device 3 forms the view straight line 9 intersecting Am and L points, see FIG. 7. This view straight line 9 is itself unable to define the "I" distance of point 12 on the "z" axis directly. Therefore, the procedure is as follows: We first determine in what distances "I" on the view straight line 9 no point 12 of the object 11 of the object space 1 may be located. In this way, we would exclude all "I" distances of the points 12 located on the view straight line 9 where intersections could be found (it is mathematical exclusion of the intersections on two or three view straight lines 9' and 9") with other view straight lines 9' and 9" forming the links between the point 12 (identified as Am point in the calculation scheme) and S and P points of other scanning devices 3. Exact identification of "I" distance of the point 12 on the view straight line 9 is achieved by comparison with the points 12 with their "I" distance already assigned and therefore, they are visible by at least two scanning devices 3. These points 12 are located on the view straight lines 9' and 9". During previous calculations of the points 12 of the object 11 of the object space 1 visible on multiple view straight line 9 intersecting Am and L points, we have achieved exact assignment of "I" distances for vast majority of the points 12 of the object. Exact assignment of "I" distance between the point 12 of the object 11 of the object space 1 on the view straight line 9 intersecting Am and L points, see FIG. 7 and connecting point 12 (Am) and the scanning device 3 (L) is not defined at this moment (see FIG. 7). At that moment, we only know where on the view straight line 9 no points 12 intersecting Am and L points may be present.

Further, for calculation of the points 12, so-called unclassified eclipsing points being visible by one scanning device 3, the procedure is described below.

The compared graticule 35 of the images taken (reference and secondary) reveal the real shift of individual points 36 from each other on individual lines of the graticule 35 on the images being compared. The following procedure applies in case we encounter an unclassified point 36 of the graticule 35 on the image line of the graticule 35, i.e. the point's position with respect to the points 36 on adjacent images could not be specified during the point identification. To the unclassified point 36, we only add information in what distances "I" on the view straight line 9 the point may not be located and under what "u'L" angle it is identified according to FIG. 7 and exact definition of the "I" position on the view straight line 9 would be made only after completion of the calculation of all points 12 of said object 11 (image). In the end of the image calculation, we would therefore have exact depth information to all points 12 of the object 11 of the object space 1 defined by two or three view straight lines 9, see FIGS. 5 and 6. The points 36 of the graticule 35 on the image, which are representation of the points 12 of the object 11 of the object space 1, will remain with not yet assigned "I" distance recordable by one view straight line 9 only, see FIG. 7. Information about point 36 location on the graticule 35 line is added to the points 36, which include "u'L" angle data under which the view straight line 9 heads to the point 12 and information in what "I" distances the point 12 may not be located on the view straight line. Each point 12 without exact "I" distance not defined on the view straight line 9 yet is a part and continued component of the system of points 12 with "I" distance already assigned from previous calculations. Each point 12 of the objects 11 of the object space 1 is a part of any adjacent part of the image. Each point 12 is a part of a group with already and exactly defined points 12 of either identical or very similar colour located very close to the point 12 for which we need to assign "I" distance on the view straight line 9. Each point 12 of the objects 11 of the object space 1 neighbouring closely with the point(s) 12 with "I" distance not assigned yet on the view straight line 9 has either colour identical or similar to point 12 or points 12 closely adjacent to them on the object 11 of the object space 1. These colours and their structure can be identified and analysed using commonly used image analysis methods (detection of edges, areas and discontinuities). This means we can define correctly these points 12 based on their comparison with other exactly defined points 12 closely neighbouring to these points 12 in exact "I" distance on the view straight line 9 after the groups of points 12 of the object 11 of the object space 1 after evaluation of edge, area and discontinuity detection. Each point 12 shown using the points 36 on the graticule 35 of the image forms a part of total graticule 35 of the image and as such they can be defined and "I" distance on the view straight line 9 could be assigned to them. The calculated points 36 of the graticule 35 as well as the depth information for the image would be defined correctly also when there are points 12 if the objects 11 of the object space 1 defined by single view straight line 9, see FIG. 7.

Following this calculation, the "depth information" resulting format is complete. The reference image of the primary scanning device 31 with "depth information" data added. This is a complete 3D image with exact definition of the points 12 of the object 11 of the object space 1.

This format is universal and it could be registered to any image photo or video codec. The image codec shown in the codec block diagram FIG. 22 and on FIG. 17 according to this invention means creation and method of placement of additional information, so-called "depth imprint" or "depth information" to standard codecs.

The 3D codec block diagram FIG. 22 describes how the depth information may be used in relation with its assignment to different codecs currently used for registration of 2D photo and video formats.

2D codecs can be divided as follows:
 a codec that supports user streams
 a codec that does not support user streams, a file system with metadata support
 a codec that does not support user streams, a file system without metadata support This is the basic division of the 2D codecs. It is obvious from the above that for each codec type the depth information would be assigned in a different way. Finally, however, all of these options would allow full reading of the modified 3D codec in two different ways.

The first is reading of the 3D codec using 2D devices where the 3D codec is processed as 2D information and the depth information would not be used at all. In this case, full processing of 3D codec could be performed on a 2D device only and either 2D or 3D codec would be used for the final cut and distribution.

The second is reading and processing of the 3D codec and its imaging using 3D devices where the 3D codec is processed as 3D information and the depth information is used here.

All three types of codecs shown in the block diagram of the 3D codec FIG. 22 and FIG. 17 can be divided as follows:
- a 3D codec that supports user streams
  - a 3D codec that does not support user streams, a file system with metadata support
  - a 3D codec that does not support user streams, a file system without metadata support The 3D codecs mentioned above include identical data in the context of this invention. This is the depth information containing also "depth imprint" as well. This depth information is defined above and it is an exact data file for each point 12 of the object 11 of the object space 1 (e.g. photo, movie etc.). This data assignment as well as the codec types (the 3D codec block diagram FIG. 22 and FIG. 17) is as follows according to our classification:
- A 3D codec that supports user streams—in case of this 3D codec the depth information is encoded as a metadata container into the 3D codec structure and becomes an integral part of the 3D codec including the object 11 registered in 2D format in the object space 1.
- A 3D codec that does not support user streams, a file system with metadata support—in case of this 3D codec the depth information is encoded as a metadata container into the 3D codec structure, whereas metadata and the object 11 registered in 2D format in the object space 1 would be registered separately. In this case, it forms an integral part of the 3D codec.
- A 3D codec that does not support user streams, a file system without metadata support—in case of this 3D codec the depth information is registered as data container together with original 2D codec. In this case, the depth information forms an independent part of the 3D codec. Combination of the original 2D codec and the depth information takes place via timeline for individual images. These two components form the 3D codec, original 2D codec+data container with the depth information.

The method of description of the points 12 of the object 11 from the object space 1 according to this invention can be e.g. implemented using connection of the scanning system 2 shown on FIG. 12. In this case, a mobile phone or a tablet is fitted with this scanning system 2 for scanning of the object 11. The scanning system 2 consists of two scanning devices 3. Connection of the scanning system 2 in this embodiment contains only two scanning devices 3, one of them is the primary scanning device 31, so-called central, consisting of camcorder and the second is the secondary scanning device 32, so-called lateral one, consisting of the radiation emitter 34 and detector 33, for example wave/particles emitter. In this case, information is missing for calculation of the depth information and therefore, we could only have the depth imprint for this method of scanning. The procedure for receiving "l" distance information for each point 12 of the object 11 located in the object space 1 and subsequent connection with the points 36 of the graticule 35 is described in the block diagram for calculation of the depth information according to FIG. 10, which includes the primary and secondary scanning devices 3, where the primary scanning device 3 being the central camcorder 31 and the secondary scanning devices 3 consists of the radiation emitter 34 and detector 33.

The method of identification of individual points 12 of shot section of the object space 1, which is shown using the points 36 of the graticule 35 on individual lines of the image graticule 35, see FIG. 5, occurs using a sequence of steps shown in the block diagram (the block diagram for calculation of the depth information for the scanning system 2 consisting of the primary scanning device 31 and secondary scanning device 32 consisting of the radiation emitter 34 and detector 33). The resulting method of identification is determination of the depth information. The primary scanning device 31 produces an image or series of images. The secondary scanning device 3 is used for measurement of the "l" distance using the radiation emitter 34, which sends out radiation (waves/particles) and time delay between sending and detecting of radiation is calculated after reflecting from the shot point 12 of the object 11 and subsequent detection of the reflected radiation by the radiation detector 33. Using the time difference between emitted radiation and radiation detection, the "l" distance on the "z" axis is calculated for each individual point of shot reality. Proceeding in this way point by point 12 of the object 11 and sorting this "l" distance information for these points 12 on the "z" axis, this distance information is assigned as the depth information as additional data to the image taken by the primary scanning device 31. Because both scanning of image on the graticule 35 of the main scanning device as well as radiation from emitter 34 from the secondary scanning device 32 occurs at the same graticule 35 and under identical "u" angle as for the scanning device 31, this data can be combined. The following structural scheme is preferably used for calculation. The primary scanning device 31 is located in the centre. The secondary scanning device 32, consisting of the radiation detector 33 arranged in a distance from the primary scanning device 31 on one side and the radiation emitter 34 arranged in a distance from the primary scanning device 31 on the other side, is in the same distance from the primary scanning device 31 and the plane on single axis with the primary scanning device 31. For this type of arrangement, no mathematical time measurement corrections are needed after detection of the radiation detector 33.

FIG. 23 shows the block diagram for calculation of the depth information using the primary scanning device 31 and the secondary scanning device 32 consisting of the radiation emitter 34 and detector 33.

This format is universal enough to be registered to any image (photo or video) codec. (See the 3D block diagram FIG. 22 and FIG. 17.)

INDUSTRIAL APPLICABILITY

The method of description of the object points from the object space is applicable where scanning, processing, and imaging of image information takes place. It is applicable in combination with all devices working with scanning, processing, and imaging of image information such as a camera, camcorder, and a scanner.

LIST OF REFERENCE MARKS 1 object space
11 object in the object space 12 object point
2 scanning system
3 scanning device
31 primary scanning device
32 secondary scanning device
33 radiation detector
34 radiation emitter
35 graticule
36 point of graticule
37 image processor of scanning device
38 calculation module of the emitter
39 calculation module of the detector
4 central processing unit
41 central processing unit of scanning device
5 block of software applications
51 software application for radiation emitter and detector control
52 software application for scanning devices control
53 software application for evaluation of points
6 calculation module with sonar application
7 data module with memory
8 block of online outputs
81 digital output
82 independent depth information
83 analogue output
9 view straight line

The invention claimed is:

1. A method of description of real points (12) of an object (11) from object space (1), using at least two scanning devices (3) arranged in a distance from each other, characterized by that for each point (12) of the object (11) of the object space (1) displayed on a graticule (35) of a primary scanning device (31), information about a real distance (I) from the point (36) of the graticule (35) of the primary scanning device (31) in the Z axis direction to the point (12) of the object (11) of the object space (1) is registered and this information is then stored to each point (36) of the graticule (35) of image as additional data providing a primary image of the object space (1),
wherein at least one secondary scanning device (32) arranged in a distance from the primary scanning device (31) registers information about the real distance (1) from the point (36) of the graticule (35) of the secondary scanning device (32), to the point (12) of the object (11) of the object space (1), providing a secondary image of object space (1), the secondary image comprising eclipsing points of the object space (1).

2. The method according to claim 1, characterized by that for the objects (11) of the object space (1) containing eclipsing points of different translucence level, information about the real distance (I) from the primary and secondary scanning device (31, 32) is registered while registering brightness and chromacity information of the eclipsing points of the object (11) by the secondary scanning device (32) at the same time, together with the translucence level of that layer point (12) and information generated in this way is stored to the point (36) of the graticule (35) of the image.

3. A connection for implementation of the method of description of real points (12) of an object (11) from object space (1) according to claim 1, comprising at least two scanning devices (3) arranged in a distance from each other, characterized by that a scanning system (2) comprises a primary scanning device (31) and at least one secondary scanning device (32), wherein the primary scanning device (31) provides a primary image of the object space (1) in the Z axis direction from a point (36) of the graticule (35) of the primary scanning device (31) and the secondary scanning device (32) provides a secondary image of the object space (1) in an axis direction from a point (36) of the graticule (35) of the secondary scanning device (32), wherein said axis forms an angle with the Z axis, wherein the scanning devices (3) are connected to inputs of CPU (4) central control unit, which includes a block (5) of software applications and a block (6) of computing module with evaluation software,
wherein communication of the block (5) of software applications and the block (6) of calculation module with the evaluation software with the CPU (4) occurs via data buses,
wherein CPU (4) outputs are connected both on a block (7) of internal memory and/or removable memory and a block (8) of online outputs.

4. The connection according to claim 3, characterized by that the secondary scanning device (32) consists of a radiation detector (33) and a radiation emitter (34).

5. The connection according to claim 3, characterized by that the primary scanning device (31) or the secondary scanning device (32) consist of a camcorder.

6. The connection according to claim 4, characterized by that the radiation detector (33) consists of CCD or CMOS sensors fitted with optics and the radiation emitter (34) consists of a laser.

7. The connection according to claim 3, characterized by that at least three scanning systems (2) are arranged in a distance around the object (11).

* * * * *